United States Patent
Roche et al.

(10) Patent No.: US 8,447,801 B1
(45) Date of Patent: May 21, 2013

(54) CONTENT SHARING WITH LIMITED CLOUD STORAGE

(71) Applicant: LavaRipples, LLC, Newton, MA (US)

(72) Inventors: Emmanuel Roche, Belmont, MA (US); Yves Schabes, Newton, MA (US)

( * ) Notice: Subject to any disclaimer, the term of this patent is extended or adjusted under 35 U.S.C. 154(b) by 0 days.

(21) Appl. No.: 13/666,705

(22) Filed: Nov. 1, 2012

(51) Int. Cl.
*G06F 15/16* (2006.01)
*G06F 7/00* (2006.01)

(52) U.S. Cl.
USPC .......................... 709/201; 709/206; 707/736

(58) Field of Classification Search
USPC .................................. 709/201, 206; 707/736
See application file for complete search history.

(56) References Cited

U.S. PATENT DOCUMENTS

| | | | |
|---|---|---|---|
| 8,200,775 B2 * | 6/2012 | Moore | 709/217 |
| 2008/0045236 A1 * | 2/2008 | Nahon et al. | 455/456.1 |
| 2010/0211535 A1 * | 8/2010 | Rosenberger | 706/20 |
| 2011/0072015 A1 * | 3/2011 | Lin et al. | 707/737 |
| 2012/0010995 A1 * | 1/2012 | Skirpa et al. | 705/14.49 |
| 2012/0158935 A1 * | 6/2012 | Kishimoto et al. | 709/223 |
| 2012/0173642 A1 * | 7/2012 | Rosenberger | 709/206 |

OTHER PUBLICATIONS

Lee, Kim & Chon "Peer-to-Peer Supported Cache System for File Transfer," last modified Jul. 29, 2003, http://www.apan.net/meetings/busan03/final_papers, [last accessed Nov. 1, 2012], 7 pages.

* cited by examiner

*Primary Examiner* — Ranodhi Serrao
(74) *Attorney, Agent, or Firm* — Wolf, Greenfield & Sacks, P.C.

(57) ABSTRACT

Apparatus and methods for sharing electronically rendered information between a plurality of devices over a data communications network with limited used of network data storage is described. Content may be shared automatically between members of a share group, without interactive content-sharing operations being executed by users. The embodiments include content tagging, commenting, searching, and syncing of content. Action metadata messages, that are not viewed by a user of a device, may be sent separately from content portions to notify share-group members of content to be shared. Sharing of content can be accomplished via peer-to-peer links as well as intermediary links, which may execute concurrently.

30 Claims, 11 Drawing Sheets

506 ⟶

| item ID 510 | status 570 | stats 580 |
|---|---|---|
| 01 | complete | 5 of 23 110221 |
| 02 | partial | 0 of 11 120406 |
| 02 | downloading | 60 of 510 120628 |

CONTENT SHARING WITH LIMITED CLOUD STORAGE

FIELD

The technology described relates to sharing content (e.g., digital information) between a plurality of devices adapted to communicate in a data communication network. More particularly, the sharing can be done with limited use of cloud data storage and without the need for devices to be on line concurrently.

BACKGROUND

Since the development of networked computers, there have been various ways in which documents and other informational content can be shared between one or more computers or devices connected to the network. In the early days of networked-based communications, file sharing or file exchange may have taken place in active peer-to-peer sessions. Typically, both a sending device and a receiving device would be required to be active and on line concurrently so that data could be transferred from a sending device to a receiving device. In some cases, manual execution of specific data transmission procedures was required by at least one user at the sending node and/or the receiving node for successful transfer of the content to be shared.

One example of an early file-sharing paradigm is the file transfer protocol (FTP). In the early FTP protocols, both sending and receiving devices were required to be active at a same time so that data communications could be carried out using two communication channels. One channel might be used to transport the desired content, whereas the second channel might be used to communicate message transfer commands and replies between the sender and receiver. In some cases, a user would be required to enter file transfer commands at a terminal to at least initiate the FTP process.

Recent developments in file sharing offer web-based solutions that require web-based or cloud data storage. One such solution is the Dropbox service offered by Dropbox, Inc. In a web-based file sharing approach, a sender may store any content for later retrieval at an intermediary device, e.g., a data-storage node, on the network. Once stored, the content is available from any location at which access may be gained to the network, and at any time. Such web-based solutions can offer convenience of use, since both sender and receiver need not be active and on-line simultaneously. However, these solutions can require large amounts of data storage space depending on the number of users and amount of content that is shared by each user.

SUMMARY

Methods and apparatus relating to content sharing and synchronization of content among a plurality of devices with limited use of cloud storage and without the need to be on line concurrently are described. The plurality of devices may operate in a data communications network, and content sharing may be executed by one or both of peer-to-peer sharing and sharing via an intermediary. In some embodiments, content sharing among designated devices (e.g., user-selected groups of devices) executes automatically without interaction from a user. Automated messaging and message processing may be used to notify receiving devices of content to be shared and retrieved by the receiving devices. The messages may be sent and processed separately from messages that contain the content to be shared. According to some embodiments, content to be shared may be stored temporarily at one or more data nodes in the data communications network. The content may be deleted from the one or more data nodes according to predefined rules, e.g., on a least-recently-used basis. A receiving device with which the content is to be shared may retrieve portions of the content from one or more resources in the network having the content. The resources may include other peer devices and one or more data nodes. The system for content sharing also provides for content tagging, editing, and commenting of content to be shared, and for automatic synching of content responsive to the tagging, editing, and commenting of the content.

As used herein, the term "content" may refer to any one of various types of machine-readable or reproducible information. For example, content may refer to analog or digital data structures including, but not limited to, text, audio, video, graph, spreadsheet, photo, CAD drawing, and ledger renderings that can be read and processed by at least one mechanized processor. The size or amount of content, in terms of digital bits, may be small (e.g., on the order of kilobytes or less) or large (e.g., on the order of megabytes, gigabytes, terabytes, or more).

As used herein, the term "sharing device" may be used to refer to a peer device in a network that is operating in sharing mode, and that has identified content that is desired to be shared with one or more other peer devices of a share group. The sharing device may have the first copy of the content within the share group, so that the sharing device disseminates copies to the one or more other peer devices.

As used herein, the term "receiving device" may be used to refer to a peer device in a network that is operating in receiving mode, and that does not yet have a copy of content that has been identified to be shared with the receiving device. The receiving device may subsequently obtain a copy of the content responsive to receiving an action metadata message that notifies the receiving device that the content has been identified to be shared with the receiving device.

As used herein, the term "super data node" may be used to refer to a data node in a network configured to temporarily stores a copy of content to be shared with one or more peer devices in the network, and to provide at least portions of the content to peer devices upon request.

As used herein, the term "content share server" may be used to refer to a server in a network configured to receive and transmit action metadata messages according to embodiments described below. A content share server may maintain data records associated with action metadata messages that include information identifying where specific content is available within the network.

In various embodiments, a method for sharing content between a plurality of devices adapted to communicate in a data communications network comprises receiving, at a first device of the plurality of devices, a first action metadata message. The action metadata message may identify content of a second device to be shared with the first device and includes a first internet address and first port number for accessing the first content at the second device. The action metadata message may further include a second internet address and second port number for accessing a copy of the first content at a data-storage node in the network. Receipt of the first action metadata message may cause the first device to automatically access the first content at one or both of the second device and the data-storage node. In some implementations, the first device may access the content simultaneously at both the second device and the data-storage node. The method for sharing content may further include processing the first action metadata message automatically by the first device without interaction by a user of the first device to identify the first internet address and first port number and the second internet address and second port number.

A system for enabling sharing of content among a plurality of devices in a data communications network may comprise at least one data-storage node in the network, in which shared content may be temporarily stored. The system may further include a content share server configured to manage communications of action metadata messages between a plurality of devices in the system. The system may also include at least one first device of the plurality of devices configured to receive a first action metadata message that identifies first content of a second device to be shared with the first device and includes an address identifier providing information for accessing at least portions of the first content at a plurality of resources in the network that may store the content. The first device may be further configured to access and download, automatically by the first device without user interaction, at least portions of the first content from two or more of the plurality of resources based upon information provided in the address identifier of the action metadata message.

According to some embodiments, a method for sharing content between a plurality of devices adapted to communicate in a data communications network may comprise acts of receiving, at a first device of the plurality of devices, a first action metadata message that includes an address identifier and a content identifier that identifies first content of a second device to be shared with the first device. The method may further include processing, by the first device, the first action metadata message to determine, based on the address identifier, a first internet address for accessing the first content at a data-storage node in the network and at least a second internet address for accessing the first content at the second device or other device of the plurality of devices. The method for sharing content may also include accessing, by the first device, at least portions of the first content at least at one or both of the data-storage node and the second device or the other device.

Aspects of content sharing include tangible data-storage devices embodying machine-readable instructions that may be executed on a machine, e.g., by a processor of the machine, to adapt the machine to perform processes of content sharing according to the disclosed embodiments.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 5C depicts a status database data structure, according to one embodiment;

The features and advantages of the present invention will become more apparent from the detailed description set forth below when taken in conjunction with the drawings.

DETAILED DESCRIPTION

I. Overview of Content Sharing

The methods and systems described below provide for the sharing of content among a plurality of devices that are adapted to communicate in a data communications network. The sharing of content comprises propagating one or more copies of content from a first device (a sharing or sending device) to one or more other devices (receiving devices) that are identified to receive copies of the content, e.g., members of a share group. The content may have been created by any of a wide variety of applications, and the devices may operate using different operating systems. The sharing of content between any two devices may occur without the need for both devices being on line concurrently. Further, a content-sharing system according to the disclosed embodiments requires limited use of cloud storage, since any content stored to data-storage nodes in the cloud is stored only temporarily and then deleted.

In various embodiments, the content sharing is mediated by action metadata messages that notify receiving devices that shared content is available for the receiving devices to retrieve. Retrieval of content may comprise one or more peer-to-peer content exchanges, one or more peer-to-data-storage-node content exchanges, or a combination of these exchanges, wherein multiple data exchanges for a single content may occur concurrently in parallel. In some implementations, the notification messaging, processing of the action metadata messages, and retrieval of content may occur automatically, without interaction from users of the devices. The methods and systems provide for content tagging, content editing, content commenting, organization of content according to content tags, searching of content, and automatic syncing of modified content.

Figure 1A:
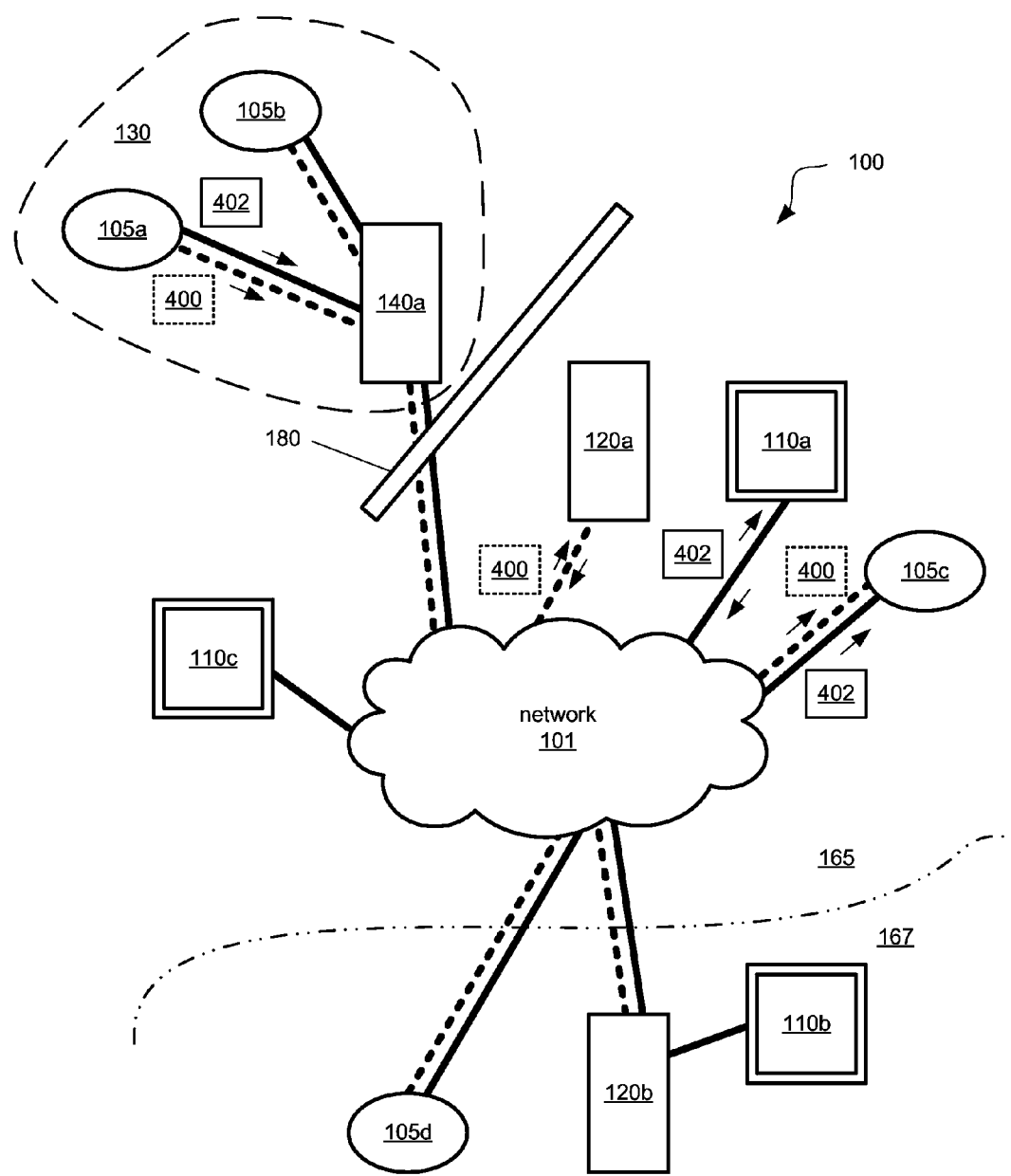
FIGS. 1A-1B depict devices configured to operate in data-communication networks, according to two embodiments of content sharing.

By way of introduction, FIG. 1A depicts one embodiment of a data communications environment 100 in which aspects of content sharing with limited cloud storage may be practiced. In overview, the data communications environment may comprise a network 101 over which electronic data may be exchanged. In communication with the network may be a plurality of electronic devices 105a-105d, e.g., peer and/or client devices such as personal computers, smart phones, personal digital assistants, etc. Some of the electronic devices 105a, 105b may belong to a group 130 that is commonly owned and/or operated in an environment protected by a firewall 180. Some of the peer devices may be commonly owned by an individual or an enterprise. There may be one or more super data nodes 110a-110c configured to temporarily store data that is shared within the content-sharing system, and at least one content share server 120a configured to communicate with the super data nodes and devices. Each of the devices, super data nodes, and content share servers may be configured to transmit and receive messages and data within the data communications environment 100. A content-sharing system may comprise at least two devices, at least one content share server, and at least one super data node. Portions of a content-sharing system may be located in a first geographic region 165 (e.g., a first town, county, state, country, or continent), and other portions of a content-sharing system may be located in a second geographic region 167.

In reference to elements of the drawings, plural elements of a same type (e.g., electronic devices 105a-105d) may be referred to generally by their base numeral (e.g., "devices 105"). A single element of the group, e.g., any one element and not a specific element of the group, may be referred to by appending "i" to the base numeral (e.g., "device 105i").

The super data nodes 110 may be configured to temporarily store content to be shared among devices 105, and subsequently automatically delete the content. The super data nodes 110 may delete the content according to a pre-selected scheme, e.g., according to a least-recently-used (LRU) caching scheme, a least-frequently used scheme, a priority-based scheme, an oldest stored scheme, or a combination of schemes. By temporarily storing content to be shared between, for example, a first device 105a and a second device 105c, a super data node 110a may serve as an intermediary between device 105a and device 105c and permit for the sharing of content when both devices are not on line concurrently. Because of temporary storage and deletion of content at the super data node 110a, a limited amount of cloud storage is needed for the content-sharing system 100.

Content share servers 120 may be configured to manage messaging traffic in the content-sharing system, wherein the messaging traffic comprises notifications to devices of content to be shared with the devices. According to some embodiments, messages related to content sharing within the system route through at least one content share server 120i. Content share servers may maintain records of content that has been shared within the content-sharing system.

The number of devices 105 within a content-sharing system may be in the hundreds in some embodiments, in the thousands in some embodiments, and in the millions in some embodiments. The content shared may include any type and form of digital or electronic data, e.g., electronic text documents, books, spreadsheets, drawings, photos, music, and video. It will be appreciated that the content-sharing system is capable of managing enormous amounts of digital or electronic data that is shared among large numbers of devices utilizing the system.

In the content-sharing system, each device 105i may be configured to act as a sharing or sending device, e.g., a user's device on which is stored some content (e.g., a photograph) that the user wishes to share with one or more members of a share group (e.g., a group of friends) When operating as a sharing device, the device (e.g., device 105a) may identify the content to be shared with one or more other devices 105, and automatically generate an action metadata message 400 that is directed to members of the share group and notifies the members that content is available for downloading. Further, each device (e.g., device 105a) may be configured to additionally act as a receiving device, e.g., a device that will receive a notification of content to be shared with the device 105a, wherein the content has been identified by another device (e.g., device 105d), and subsequently download the content from one or more resources within the content-sharing system.

To be configured to identify content for sharing and receive notifications of content to be downloaded in the content-sharing system, each device 105i may register with a content share server 120i to become a member device of the content-sharing system. After registration, each device may receive or download machine-readable instructions to configure the device for identifying and receiving and/or retrieving shared content, for executing some content sharing functions off-line, and for otherwise participating in the content-sharing system. As part of the registration process, each device 105i may receive a unique device identification number that is assigned by a content share server and used by servers and devices to keep records of content available at each device. After registration and upon connecting to a network, a device 105i may log in with a content share server 120i to utilize the content-sharing system.

In operation and according to some embodiments, at least one super data node 110i may act in conjunction with at least one content share server 120i to facilitate sharing of content between two or more devices 105. For example, a user of a first device 105a (a sharing device) may have obtained or created content (text document, photograph, web link, audio recording, etc.) that the user wishes to share with other devices 105b, 105c (receiving devices). The content may have been created by other applications and devices, e.g., by text-editing applications, drawing applications, photographic devices, audio recording devices. The receiving devices may be members of a selected share group and may be commonly owned by the user, or may be devices belonging to or operated by friends, family, coworkers, etc. In operation on the devices 105, content share servers 120, and super data nodes 110 are applications comprising machine-readable instructions that adapt and control each apparatus to operate in cooperation to execute content-sharing processes according to the present embodiments. An application operating on the sharing device 105a may provide a framework within which content may be selected and identified by the user of the device for sharing with the members of the share group. Different operating systems or platforms may be in operation on different devices 105.

Identification, by the sharing device 105a, of content to be shared may occur in a variety of ways. For example, identification may occur upon a user denoting the content as content to be shared, e.g., placing in a share file, altering a name of the content, selecting the content and clicking on a share icon, etc. Identification of content to be shared may also occur automatically, without user interaction, for content that was previously identified for sharing upon modifications (e.g., editing, commenting, content tagging) associated with the content.

Upon identification of the content to be shared, the sharing device 105a may generate an action metadata message 400 that is sent via the network 101 to at least a content share server 120a. The content share server may replicate and/or modify the action metadata message 400 and send action metadata messages to the receiving devices 105b, 105c. An action metadata message may also be sent (not shown in FIG. 1A) to a super data node 110a by either the sharing device

105a or the content share server 120a. The action metadata message 400 comprises a notification that content is available at the sharing device 105a for sharing with selected receiving devices 105b, 105c. The generation and transmission of the action metadata message 400 at the sharing device 105a may occur automatically and without user interaction.

Upon receipt of an action metadata message, a receiving device 105b may process the message to obtain information about the content and address information identifying from where the content may be retrieved. The address information may have been inserted or modified by the content share server 120a and include one or more addresses within the communications environment 100 identifying resources (e.g., other devices 105 and one or more super data nodes 110) from which the content may be retrieved. With the address information, the receiving device 105b may contact one or more of the identified resources and begin downloading portions of the content (e.g., document fragments) in the form of content portion messages 402. The downloading of content portions from a plurality of resources may occur concurrently and in parallel. The processing of the action metadata message, contacting the one or more resources, and downloading of content portions may occur automatically at the receiving device 105b without user interaction. The other identified receiving device 105c may act in a same manner.

Upon receipt of an action metadata message, a super data node 110a may process the message and contact the sharing device 105a to obtain a copy of the content. The super data node 110a may then store the content temporarily according to predetermined rules for temporary data storage. After temporary storage, the super data node 110a may delete the content from its data storage without copying and/or forwarding the content to another data storage node. If, after deletion of content, a super data node 110a receives a subsequent request for the deleted content, the super data node is configured to identify which resources in the system have or may have a copy of at least portions of the content and to retrieve the content from the identified resources. The super data node 110a may communicate with or receive a communication from a content share server to determine which resources have or may have a copy of at least portions of the content.

If, at the time of the generation and transmission of the original action metadata message 400, a receiving device 105c is not on line, the content share server 120a will hold or buffer the action metadata message directed to the device 105c until that device comes on line, and then transmit the action metadata message to the device 105c. If, for any reason, a receiving device 105c is unable to obtain a copy of the content identified in an action metadata message 400, then the device 105c may send a "failed retrieval" notification to the content share server 120a. In response, the content share server 120a may send a "re-share request" to the original sharing device 105a that results in the re-identification of the content to be shared. The re-identification of the content to be shared may result in generation and transmission, by the device 105a, of an action metadata message associated with the content. The generation and transmission of the action metadata message may result in re-propagation of the content to at least one super data node from which the content may be retrieved by the receiving device 105c.

After a receiving device 105b has obtained at least one portion of the content, a "download complete" notification may be sent to the content share server 120a. The notification may be sent by the receiving device 105b, or by a resource (e.g., a super data node) from which the content was retrieved by the receiving device. The content share server 120a may maintain a system-wide record that includes information identifying which resources within the system have copies of at least portions of a particular content. When a content share server learns that a receiving device 105b has obtained a copy of at least a portion of the content, it may add an address for the device 105b to an action metadata message 400 directed to receiving device 105c.

In some embodiments, a receiving device 105b may not notify a content share server 120a that it has received a portion of content or all content identified to be shared with the receiving device. In such an embodiment, the content share server 120a may maintain a system-wide record that includes information identifying which resources within the system could have copies of at least portions of a particular content, without knowing whether or not the resources actually have the copies. For example, some resources may have received a copy of content or portions of content and subsequently deleted the content. In some embodiments, a resource that has deleted content may send an action metadata message automatically indicating that the content has been deleted. Such a message may allow a content share server to update its system-wide records as to which resources have the content.

As may be appreciated from the foregoing brief overview, according to some embodiments, the responsibility for obtaining content that has been identified for sharing is borne by each receiving device 105i identified by an action metadata message associated with the content. Responsive to processing a received action metadata message, a receiving device issues one or more requests for content portions to one or more of the resources identified by the action metadata message 400. Each receiving device may then request and receive content from one or more of the resources having the content. Each receiving device 105i may be configured to obtain content portion messages 402 from a plurality of resources concurrently. Since content is transmitted in portions, a receiving device may begin downloading content portions from a resource before the resource has all portions of a content.

Figure 1B:
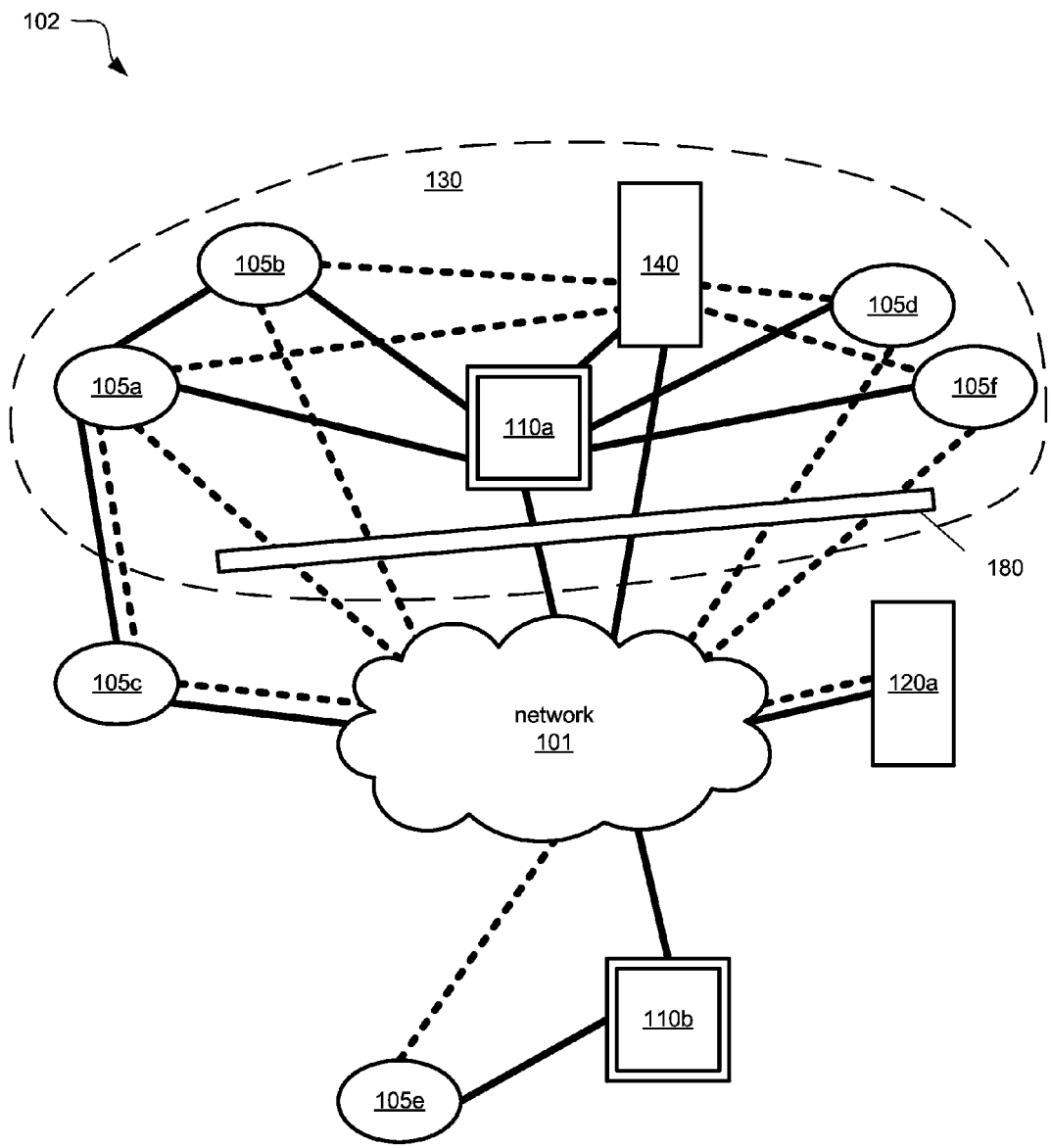

Alternative embodiments for a content-sharing system may be employed. One alternative arrangement for a data communications environment 102 is shown in FIG. 1B. In this arrangement, a number of devices 105a, 105b, 105c, 105d, 105f, and a super data node 110a may be commonly owned and/or managed by an entity, e.g., an individual, a business, an agency, an academic institution, a medical campus, etc. The entity may operate a server 140. Content sharing may be practiced within the group 130 of commonly owned devices, according to some embodiments. For example, content-sharing services according to embodiments described herein may be installed on server 140, which may communicate content-sharing information to a content share server 120a. A device 105c may be a roaming device in some embodiments, e.g., a smart phone or PDA, that may be configured to communicate with other devices 105a, 105b in the group 130 of commonly owned devices, or to communicate via the internet 101 when out of range of the other devices in the group 130. In some embodiments, a device 105c may be configured to communicate with peer devices and/or server 140 in the group 130, and may not be configured to communicate via network 101.

II. System Embodiments

Details of apparatus and apparatus functionality are described in this section. The electronic devices 105 and other system apparatus, e.g., super data nodes 110 and content share servers 120, may be configured to perform their respective described functionalities by executing, on at least one processor, specifically-coded machine-readable instructions that may be loaded to and stored in memory devices of each apparatus. The coding of the machine-readable instructions may be in any one or more suitable programming languages, e.g., C, C++, Java, etc. The executed instructions may operate in conjunction with hardware on each apparatus to configure the apparatus to perform a desired functionality. The functionality of the apparatuses include associated methods for carrying out content sharing. Any examples of methods and apparatus functionality provided below are intended for teaching purposes and are not intended to limit the invention to only the described operations and steps.

Devices 105 may include any type of consumer electronic device that is adapted to communicate over a network and/or to communicate with another electronic device. Examples of devices 105 include, but are not limited to, commercial and personal computers, laptops, tablet computers, netbooks, smart phones, mobile phones, personal digital assistants (PDAs), video gaming devices, automotive computers configured to connect to a network, video and still-photo cameras configured to connect to a network, and commercial or research instruments configured to connect to a network. Some of the devices 105 may include visual displays for displaying information to a user. Some of the devices 105 may include operational keys and/or buttons for entering information, selecting functions, or activating features of the devices. Some of the devices 105 may include a touchpad and/or touch screen as a user interface element. Some devices may include interactive voice recognition functionality. In various embodiments, the devices 105 include at least one processor that can be programmed with machine-readable instructions to execute a desired function.

Some devices 105 may be configured to link to network 101 via wired or wireless links. Some devices may be configured to communicate with peer devices via wired or wireless links. Additionally, a device (e.g., device 105*a* in FIG. 1B) may be configured for both peer-to-peer communications as well as communications via the network 101. In various embodiments, a device 105*i* may be configured to connect to a content share server 120*i* and/or super data node 110*i* each time the device comes on line. After connecting to a content share server 120*i*, a device 105*i* may be configured to receive any action metadata messages 400 sent to the device when it was off line as well as receive action metadata messages while on line. The device 105*i* may also transmit any action metadata messages 400 associated with content to be shared by the device, where the content may have been identified for sharing when the device was off line or while on line. Communications of action metadata messages 400 and/or content portion messages 402 may be executed according to established internet standards and/or proprietary networking protocols.

A device 105*a* may connect with at least one super data node 110*i* for several purposes. A first purpose may be to download content identified in an action metadata message that the device received from a content share server 120*i*. A second purpose may be to upload content that the device 105*a* has identified to be shared with at least one other device 105*c*. After connecting to a super data node 110*i*, a device 105*i* may be configured to upload (or download) content portion messages 402 associated with content to (or form) the super data node. A device may also be configured to connect with one or more peer devices identified by an action metadata message for purposes of downloading content portions.

In some embodiments, a plurality of devices 105*a*, 105*b* may be under common ownership or common control. As one example, a common group 130 may comprise a plurality of devices (e.g., computer, tablet, smart phone) owned by an individual. As another example, a common group 130 may comprise a plurality of devices owned by an organization. In some implementations, a common group may include a server 140*a*. As noted above and with reference to FIG. 1B, a common group may include a super data node, and content sharing according to the described embodiments may be practiced within the common group 130, e.g., within an enterprise.

As noted above, a device 105*i* may be configured to operate as a sharing device and a receiving device. When operating as a sharing device, a device 105*i* may be specially adapted with machine-readable instructions to enable a user of a device to identify share groups and content that the user wishes to share with one or more of the share groups. A share group may comprise other users having devices 105. As one example, a user operating a device 105*a* may have obtained a digital photograph that the user wishes to share with one or more other users operating devices 105*c*-105*e*. The user of the first sharing device 105*a* may define, at any time, a share group comprising addresses of one or more devices 105 with which the user wishes to share content. For example, the user of the device 105*a*, operating as a sharing device, may have previously defined a share group as "work friends" that includes addresses and/or device identification numbers for devices 105*c*, 105*d*, and 105*e*. To share the photograph, the user may simply designate the data file containing the digital photo as content to be shared with the "college friends" share group. Designating the file for sharing may comprise saving or dragging and dropping the file into a folder having a share group name, or otherwise associating the file with a share group. In some implementations, designating the file for sharing may comprise adding a special character or character string to a file name, or selecting a file and clicking on an icon associated with the share group.

Though the present example relates to the sharing of a recently-acquired photograph, other modes of identifying content for sharing may also be implemented. For example, the system may be configured such that a user's editing of content previously shared results in an automatic re-identification of the content as content to be shared. By re-identifying the content to be shared, the edited version of the content will be redistributed, or resynchronized, with each member of a share group. As another example, the content-sharing system may be configured to allow a user to add or associate a comment and/or content tag with content to be shared or previously shared. The content tag may be a brief descriptive character string such as a hashtag. The adding or associating of a comment or content tag with content previously shared may re-identify the content as content to be shared.

Regardless of how the content is identified for sharing, responsive to the identification of content to be shared, device 105*a* operating as a sharing device may generate automatically an action metadata message 400 that is transmitted over the network 101 to a content share server 120*i* and directed to at least one receiving device. In some embodiments, a device 105*i* operating in sharing mode may be configured to generate and transmit a plurality of action metadata messages, one for each member in a share group, responsive to content being identified for sharing. In other embodiments, a device 105*i* operating in sharing mode may be configured to send a single action metadata message to a content share server 120*i*, whereupon the content share server generates action metadata messages for one or more members of a designated share group and transmits the messages to the members. The content share server 120*i* may be configured to maintain a record of share groups and share group members.

A device 105*i* may additionally be configured to operate as a receiving device. In various embodiments, a device 105*i* operating in receiving mode may be adapted to receive and process an action metadata message 400. In some implementations, an action metadata message 400 may be received and processed automatically without interaction from a user of the device 105*i*. As one example, a user may be operating a device 105*a* for a first purpose. The device 105*a* may be in communication with network 101. While the device 105*a* is being used for the first purpose, it may receive an action metadata message 400 via the network 101. In the background, device 105*a* may process the action metadata message to identify one or more address identifiers contained in the message. The address identifiers may provide for the identification of resources in the system that have content to be shared with the device 105*a* operating in receiving mode. Then, still in the background, device 105*a* may request and receive content using the one or more address identifiers. Meanwhile, the user of device 105*a* continues using the device for the first purpose, and may or may not notice that an action metadata message has been received and acted upon nor that content is being received. In some embodiments, a device 105*i* may be configured to request permission from a user before processing an action metadata message, and/or before retrieving content from external sources. In some implementations, a device 105*i* may provide a visual, audio, or tactile notice to a user upon receiving an action metadata message or upon receiving content from another source.

In some embodiments, a device operating in receiving mode may be configured to contact a content share server 120*i* after receipt of an action metadata message 400, and request addresses of super data nodes 110 and/or devices 105 that have a copy of the content. For example, the action metadata message may include an address identifier, e.g., an address and optionally a port number of the content share server 120*i* or another device or intermediary device that maintains address identifiers of devices and/or super data nodes 110 having a copy of the content, that provides for the identification of one or more resources from which the content may be retrieved. The action metadata message 400 may further include an additional identifier that links the action metadata message with one or more internet addresses maintained by the content share server at which the content to be shared may be obtained by the device operating in receiving mode.

A device 105*i* operating in receiving mode may be configured to access content from more than one location concurrently using address identifiers obtained from the processing of the action metadata message 400. In some embodiments, a receiving device 105*i* may be configured to first attempt accessing content at a super data node 110*i* that may be geographically closest to the device 105*i*, and subsequently attempt accessing content at other devices and/or super data nodes. The subsequent attempt may occur while content portions are being downloaded from the first resource. In some implementations, a device 105*i* may prioritize a selection of resources for retrieving content portions based on resource geographic location, speed of the resource, network traffic at the resource, and security level of the resource.

According to some embodiments, a sharing device 105*b* behind a firewall 180 may open a connection to a super data node 110*a* for the purpose of downloading content portions. The firewall 180 may be configured to prevent unauthorized transmission, such as malware, from adversely affecting devices protected by the firewall. Another device 105*i* with which the content is to be shared may be configured to utilize the opened connection and access content portions from the sharing device 105*b*. The other device may also access content portions from the super data node 110*a* as the content portions become available.

Since content may be transmitted in portions, e.g., as content portion messages 402, a device 105*i* may retrieve content concurrently and in parallel from a plurality of resources in the content-sharing system 100. The number of parallel channels opened by a receiving device 105*i* may be dependent upon the type of receiving device 105*i*. For example, a computer may open three or more parallel communication channels for retrieving content portions from a plurality of devices and super data nodes. A smart phone may open three or fewer communication channels. In some embodiments, a user may set a maximum number of parallel channels that may be opened by the device.

According to some embodiments, if a receiving device 105*d* is on line concurrently with sharing device 105*a*, receiving device 105*d* may be configured to receive and process the action metadata message 400 automatically, and may then retrieve one or more content portion messages 402 directly from the sharing device 105*a* in a peer-to-peer exchange. The peer-to-peer exchange may be established over the network 101, or may be established directly between a sharing device 105*a* and receiving device 105*d* in some embodiments if they are in close proximity. In some embodiments, a receiving device 105*d* may additionally and concurrently obtain content portions from a super data node 110*a* where the content portions may be stored. Further, receiving device 105*d* may additionally and concurrently obtain content portions from one or more other devices 105 (e.g., other devices in the share group) that may have the content to be shared.

If a receiving device 105*d* is not on line concurrently with sharing device 105*a* or is not reachable because the device 105*d* is behind a firewall, the sharing device may be configured to provide content portion messages 402 to a super data node 110*a* that may store the content portions temporarily. In some embodiments, the providing of the content portion messages 402 to a super data node may be responsive to a request received by the sharing device 105*a* for the content portions that was issued by a super data node. For example, a content share server 120*i* may determine that the receiving device 105*d* is not currently reachable and notify a super data node to issue a request to the sharing device 105*a* for the content. When receiving device 105*d* comes on line, receiving device may be configured to receive and process the action metadata message and then retrieve content portions from the super data node 110*a*, other devices 105 that may have the content and that are on line, and optionally also from the sharing device 105*a* if the sharing device is on line, or comes on line, concurrently with the receiving device.

In some implementations, whenever a device 105*i* initiates a sharing action, e.g., generation of an action metadata message, it may also upload content identified in the action metadata message to at least one super data node 110*i*. The super data node may be a super data node that has been previously assigned, e.g., by a content share server, to the device. In some cases, the super data node may be assigned responsive to the content share server receiving the action metadata message.

In some embodiments, a receiving device 105*i* may be further configured to screen action metadata messages 400 and/or content portions 402 for malware. The screening may be performed automatically, and a notice may be provided to a user if an action metadata message or content portion contains or is suspected to contain malware. The user may then be provided with an option of discarding the action metadata message 400 and/or refusing receipt of content portions 402. In some implementations, the discarding and refusal of receipt may be executed automatically without providing an option to receive and process the data to the user. If an action metadata message is not processed by a receiving device, the receiving device may automatically generate a notification to the content share server that the message was not processed. The notification may be used by the content share server to correct its system-wide database relating to shared content.

Network 101 may be a local area network (LAN), a medium area network (MAN), or a wide area network (WAN). A LAN may be a network established and maintained by an enterprise, e.g., an academic institution, a medical campus, a business, a firm, an agency, etc. Examples of a WAN may include a federal network and the world-wide web extending over large geographic regions or across the globe. In various embodiments, network 101 comprises communication links, wired and/or wireless, over which data may be communicated between nodes of the network. At some network nodes may be one or more electronic devices configured to transmit and receive data. Network 101 may further include routing devices or other intermediary devices at some nodes configured to route data transmissions to intended destinations.

Super data nodes 110 may be added to a network for purposes of practicing content sharing with limited cloud storage. In various embodiments, the super data nodes 110 provide temporary data storage of content to be shared between a plurality of devices 105. The inventors have recognized that cloud storage can entail a cost to a user for modest amounts of cloud storage, and can further pose a security concern for some users. The inventors have also recognized that with current technology, many devices connected to a network have ample amounts of data storage available locally, e.g., data storage on hard drives or memory circuits of computing devices or systems. For example, it is currently possible to purchase laptop computers having a terabyte ($10^{12}$) of digital memory. Accordingly, the inventors have postulated that it may be unnecessary to purchase large amounts of cloud storage for content sharing purposes when ample amounts of storage is available locally to individuals or organizations, and sometimes not fully utilized.

Figure 2:
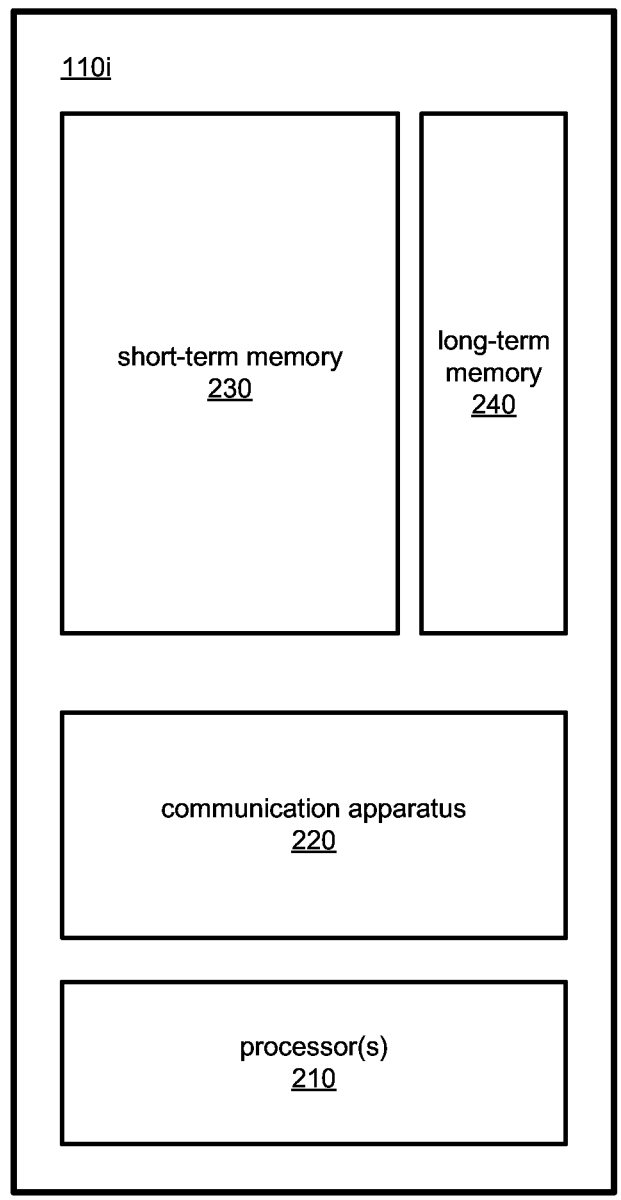
FIG. 2 is a block diagram representing components of a super data node, according to one embodiment.

According to some embodiments, super data nodes 110 may comprise at least one processor 210 operating in conjunction with at least one data storage device as illustrated in FIG. 2. A super data node 110$i$ may further include data communication apparatus 220 (e.g., modems, ports, software, and hardware) for adapting the super data node to receive and transmit data over the network 101. A super data node 110$i$ may be operated in conjunction with one or more content share servers 120. For example, a super data node and content share server may exchange information that is necessary for operation of the content-sharing system. The super data node may include a portion of memory configured as long-term storage 240, and may further include a portion of memory configured as short-term storage 230. In some embodiments, the short-term storage 230 may comprise the majority of memory managed by the super data node. The short-term memory may be configured as a least-recently used (LRU) cache memory, for which oldest data that is accessed the least amount is deleted first from the short-term storage 230 when the memory becomes full. The short-term memory may be configured to store temporarily content designated to be shared between a plurality of devices 105. Long-term storage 240 may be used to retain machine-readable instructions that are used for operation of the super data node. Though depicted as a single unit in the drawings, a super data node 110$i$ may be a single device, or may comprise a plurality of similar devices having data storage capabilities.

In some implementations, a super data node 110$i$ is configured to retrieve content that has been identified to be shared from a sharing device 105$i$. According to one embodiment, after a device 105$i$ identifies content to be shared, the device may send a "content-available" message to a super data node 110$i$. The message may identify the content to be shared and the total size of the content. After receiving the content-available message, the super data node may then automatically request the content from the device. The content may be provided to the super data node in content portion messages 402 or any other suitable transmission format.

The content-sharing system 100 may comprise one or more content share servers 120. Though depicted as a single unit in the drawings, a content share server 120$i$ may be a single machine or comprise a plurality of machines, such as a server farm. In some implementations, there may be one content share server farm that services the content-sharing system 100. In some embodiments, a content share server may be in communication with one or more super data nodes 110. In some embodiments, a content share server may include a super data node 110$i$ within the same facility.

Content share servers 120 may be configured to receive and process action metadata messages 400 that are issued by sharing devices. If the system 100 has multiple content share servers 120, the content share servers may be configured to communicate information about action metadata messages or databases related to action metadata messages, so that all servers maintain common data records regarding action metadata messages and shared content.

A content share server 120$i$ may comprise registration functionality, log-in functionality, and provide for storage of data records that are used in the content-sharing system 100. For example, a new user of the content-sharing system operating a device 105$i$ may first be required to register with a content share server 120$i$. As part of the registration process, the content share server 120$i$ may assign the newly added device 105$i$ a unique device identification number. The device identification number may be encrypted or not encrypted. A new user may be required to establish a password and/or log-in ID in order to access functionality of the content-sharing system. When any registered device 105$i$ comes on line, it may initially connect to a content share server 120$i$ and provide its unique device identification number. The content share server may use the device identification number to retrieve and forward any action metadata messages that may have been sent to the device when it was off line. The content share server may also use the device identification number to maintain a dynamic "on-line" record of which devices are currently on line. This dynamic record may be used by the content share server to indicate, in forwarded action metadata messages, which devices in a share group are currently on line and have content available for retrieving. In some cases, the content share server may indicate which devices in a share group are currently off line and also have the content. Additionally, the content share server 120$i$ may also use the device identification number to maintain a record of shared content stored by each device 105$i$ and super data node 110$i$. Further details of records maintained by a content share server and a super data node are described below.

A content share server 120$i$ may also be configured to provide a copy of at least a portion of its data records (e.g., a portion of a system-wide action and/or object database) to each device 105$i$ in the content-sharing system. The copy may be provided on a regular basis, e.g., each time a device 105$i$ logs in with the content share server 120$i$, or whenever a modification occurs to the portion of the database. Copies of a content share server's system-wide data records may also be provided to distributed back-up apparatus for retrieval and used in the event of a content share server crash. According to some embodiments, the log-in and transmission of action metadata messages, content portions, and updating of database records may be executed automatically when a device comes on line without a need for user input at a device 105*i*. As one example of receiving and updating database records, the portion of data records received at a device 105*a* from a content share server 120*a* may be records that the device 105*a* has permission to receive and that may only be relevant to the device 105*a*. For example, the device 105*a* may only receive records associated with content shared by members of one or more content share groups to which device 105*a* belongs. By maintaining a local "sub-copy" of content share server's database records, a device 105*i* may perform some content sharing operations when the device is off line. A content share server may also provide a copy of a portion of its data records to each super data node 110*i* on a regular basis.

In some embodiments, a content share server is configured to communicate action metadata messages 400 through firewalls 180. As one example and referring again to FIG. 1A, when a device 105*b* opens a connection through a firewall, content share server 120*a* can recognize the device by its unique identification number. The content share server can then forward action metadata messages to the device 105*b* through the opened connection.

A content share server 120*a* may be configured to receive and process action metadata messages to obtain information about the message and content that is identified in each message. The content share server 120*a* may then forward versions of the action metadata message to members of the share group. With reference to FIG. 1B and according to one example, a sharing device 105*b* may initiate an action metadata message 400 which may be transmitted to a content share server 120*a* before being forwarded to members of a share group. One or more content share servers 120 may maintain a dynamic record that identifies which members of the share group are currently on line. If members of the share group to which an action metadata message is directed are not on line concurrently with the sharing device 105*b*, server 120*a* may identify which super data node 110*i* will receive or has received the content associated with the action metadata message and include that super data node's internet address and optionally a port number in the action metadata message. To include the address and port number in the action metadata message, the server may alter the action metadata message 400 to include the super data node's address and port number to the address identifier portion 425 of the action metadata message 400. The altering of the action metadata message 400 may, in some embodiments, involve decrypting the message, altering the message, and then encrypting the message before transmitting an action metadata message 400 to one or more members of a share group.

A server 140*a* may comprise a single computing device, or a group of computing devices (e.g., a server farm), that is adapted to provide a particular network service in response to requests received over the network from client devices. A server 140*a* may be adapted to provide any of a wide variety of informational and/or computational services, e.g., news service, music, video, computation, language translation, financial, medical, business, agency, database searching, data storage, internet connection service, email, social networking, etc. A server 140*a* may be owned and/or operated by an entity, e.g., a business, an agency, an academic institution, a medical campus, etc.

Figure 3:
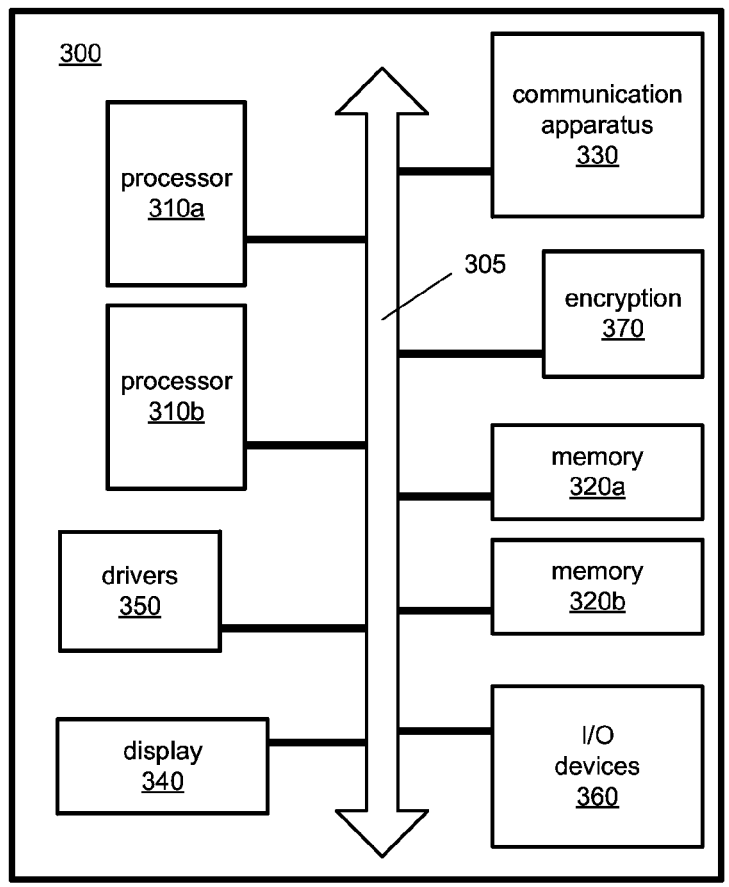
FIG. 3 is a block diagram representing components of an apparatus that may be adapted to operate as a device, super data node, or content share server in the content-sharing systems depicted in FIGS. 1A and 1B, according to various embodiments.

A super data node 110*i*, content share server 120*i*, or a device 105*i* may be embodied as a combination of hardware and software. In some implementations, a super data node, server, or a device may be embodied in hardware only, e.g., where processes are encoded in any combination of a programmable logic array (PLA), a complex programmable logic device (CPLD), and a field-programmable gate array (FPGA). A super data node 110*i*, server 120*i*, or a device 105*i* may be a custom manufactured apparatus, or may be a processing device 300 that has been specially adapted with machine-readable instructions to execute network-based content-sharing algorithms in accordance with the various embodiments of the present invention. One example of a processing device is depicted in FIG. 3. According to some embodiments, a processing device 300 may comprise one or more electronic processors 310*a*, 310*b*, and one or more types of data storage devices 320*a*, 320*b*. A processor 310*i* may comprise any type and form of data processing device, e.g., any combination of a microprocessor, microcontroller, a digital signal processor, and a field-programmable gate array (FPGA). There may be more than one processor in the system in some embodiments. In some cases, there may be a combination of processor types, e.g., a microprocessor and one or more FPGAs. When in operation, an operating system may execute on the processor and provide for user operation of the apparatus, which may include running multiple software applications on the processor. The memory may include any type and form of RAM-type memory devices and ROM-type memory devices.

Processing device 300 may further include a display 340 (e.g., a video monitor, an LCD display, a plasma display, etc.), one or more input/output devices 360 (e.g., keyboard, touchpad, touch screen, microphone, speaker, printer), and communication apparatus 330 (e.g., software, networking cards or boards, wireless transceivers, and/or physical sockets). The processing device 300 may further include device drivers, e.g., software modules specifically designed to execute on the processor(s) and adapt the processors to communicate with and control system components. In some embodiments, processing device 300 includes encryption/decryption hardware and/or software 370 that is used to encrypt selected outgoing data transmissions and decrypt incoming encrypted data transmissions. Components of processing device 300 may communicate over a bus 305 that carries data and control signals between the components. The bus may provide for expansion of the system to include other components not shown in FIG. 3. Examples of processing devices include, but are not limited to, computers, laptops, tablet computers, netbooks, smart phones, mobile phones, personal digital assistants (PDAs), video gaming devices, automotive computers configured to connect to a network, video and still-photo cameras configured to connect to a network, and commercial or research instruments configured to connect to a network that have been specially adapted with machine readable instructions to carry out content sharing according to embodiments described herein.

Figure 4A:
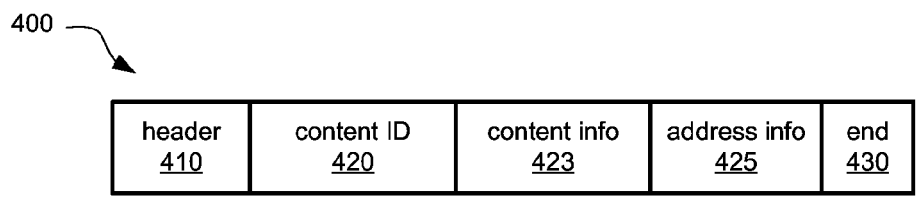
FIG. 4A represents a format of an action metadata message, according to one embodiment.

As described above, a first device that has identified content to be shared with one or more other devices may generate an action metadata message that is used to notify the one or more other devices of the content to be shared. In various embodiments, an action metadata message contains information about the content to be shared, but does not contain the content data that is to be shared. One example of an action metadata message 400 is depicted in FIG. 4A. Some or all of the action metadata message may be encrypted for transmission using any suitable encryption algorithm, e.g., a secure hashing algorithm (SHA-1).

An action metadata message 400 may comprise a data structure to be transmitted as an electronic message. The action metadata message may comprise a header 410 portion that may include routing information for and a message size of the action metadata message. The header may also include a total content size that identifies the total size, e.g., in bytes, of the content to be shared that is associated with the action metadata message. The header 410 may include one or more addresses for each member in a share group to which the action metadata message should be sent and/or may include a share group identifier that identifies a share group with which the content is to be shared. Also included may be an identifier 420 of the content to be shared. The action metadata message 400 may further include a content information data field 423. Also included in the action metadata message 400 may be an address information data field 425 that may be used to identify one or more internet locations from which the content may be retrieved. An end of message identifier 430 may be appended to the end of the action metadata message 400. In some embodiments, action metadata messages may contain at least a portion of the content to be shared.

The identifier 420 may comprise a data structure that includes a name and/or location of the content to be shared. According to some embodiments, the identifier 420 comprises a unique content identifier that is associated with the content to be shared, and that may be assigned by a content share server 120*i*. The identifier may include a path name and file name, in some embodiments. In some implementations, the identifier may include a pointer to an address in memory where the content is stored.

The content information data field 423 may include information descriptive of the content to be shared. The content information data field may include one or more content tags in some embodiments, where a content tag may be associated with a document by a user. A content tag may comprise a succinct alpha-numeric data string that may be descriptive of the content, and may include one or more symbols that identify the data string as a content tag. One example of a content tag may be "#finewines" that may be associated with electronic content such as documents, websites (e.g., URL strings), images, maps, music and advertisements relating to vintage wines, wine tasting, vineyards, wine making, vintage wine suppliers, etc.

The content information data field 423 may include additional information descriptive of the content. For example, the data field may include a comment (e.g., text data strings) about the content, where the comment may have been created and associated with the document by a user. In various embodiments, the content-sharing system is configured to provide for commenting of shared content. The content information data field may include "permission" information, that identifies member devices 105 with which the content may be shared. According to some embodiments, the content information data field 423 may include time and date information identifying a date and time at which the content to be shared was created and/or last modified. In some embodiments, the time and date information may identify dates and times for each modification of the content. In some implementations, the content information data field 423 may include information identifying why the content is being shared, e.g., creation of a new document, modification of an existing document, adding or removing a content tag from an existing document, associating a comment with the document, changing a permission setting for the document, etc.

The action metadata message 400 may further contain at least one address information data field 425. When the action metadata message 400 is processed by a receiving device 105*i*, the address information data field 425 provides information about locations or resources in the network 101 from which content identified in the action metadata message may be retrieved by the receiving device. According to some embodiments, the address information data field 425 includes at least two internet address identifiers. A first address identifier may comprise the internet address, and optionally a port number, of a sharing device 105*i* sharing the content. A second address identifier may comprise the internet address, and optionally a port number, of a super data node 110*i* where a copy of the content to be shared is stored. Port numbers (e.g., unsigned multi-bit integers) may or may not be included with address identifiers. For example, the content-sharing system 100 may be configured to use fixed and pre-determined port numbers that are once communicated to each device. Because two address identifiers may be provided in the action metadata message, a receiving device in the share group can retrieve portions of the content from at least one location. In some embodiments, an action metadata message 400 may include three or more address identifiers, each identifying locations from which a receiving device can retrieve portions of the content to be shared.

According to some embodiments, the address information data field 425 may be populated by both a sharing device 105*i* and a content share server 120*i*. For example, a sharing device may add its own internet address to the address information data field 425 when creating an action metadata message 400. A content share server 120*i*, may add additional address identifiers (e.g., of super data nodes 110 and/or other devices 105 having the content) to the address information data field 425 when processing the action metadata message for transmission to members of a share group.

In some implementations, the address information data field 425 may include only one address identifier. For example, if only one device 105*i* or one super data node 110*i* having a copy of the content is on line concurrently with the receiving device, a content share server may only provide one address identifier in an action metadata message 400.

Figure 4B:
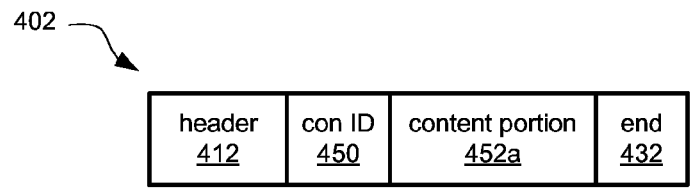
FIG. 4B represents a format of a content portion message that may be used for transmission of content, according to one embodiment.

A sharing device may also be configured to send content portions over the network. An example of a content portion message 402 is shown in FIG. 4B. According to some embodiments, an entire content (e.g., a photo, video, music recording, document) to be shared with share group members is broken into portions for transmission. The portions may be prepared by the sharing device into data structures for transmission over the network 101, e.g., prepared as messaging units. The data structures may be referred to herein as "content portion messages." Part or all of the content portion message may be encrypted for transmission using any suitable encrypting algorithm, e.g., a secure hashing algorithm such as SHA-1.

A content portion message 402 may include a header 412 that may include routing information, total content size, and/or message size. A content portion message may further include, as part of the header or as a separate item, a content identifier 450. The content identifier may be a unique identifier in some implementations that associates the content portion with the entire content to be shared. According to some embodiments, a content share server 120*i* may assign a unique content identifier to each content item that is shared within the content-sharing system 100. The unique content identifier may be any suitable alpha-numeric string. Modified versions of content may also receive a unique content identifier. In some embodiments, the content identifier may be encrypted using a hashing algorithm, such as the SHA-1 algorithm.

A content identifier may include an appended portion that uniquely identifies a content portion 452*a*. For example, a content identifier, encrypted or non-encrypted, may be appended with a numeric or alpha-numeric suffix (e.g., 1, 2, 3, –01, –02, –03, a1, a2, a3, [001], [002], [003], etc.) to uniquely identify each content portion of a content. In some implementations, the content identifier 450 may include ordering information, that identifies how the content portion is ordered within plurality of content portions that are representative of the entire content to be shared. An example of ordering information may be a serially incremented number or alpha-numeric string that is appended to or associated with the unique content identifier or a unique content portion identifier. The ordering information may allow content portions to be received out of order by a share group member and then subsequently re-assembled in a correct order.

In some embodiments, the content identifier may include additional data about the content, e.g., a file name, an author or originator of the content, a date and/or time of origination of the content, a date and/or time at which the content was last modified, an identification of the last person to modify the content, a list of dates and/or times at which the content was modified, a list of individuals who modified the content, a size of the content and/or content portion, a version number, etc. Information about the content that may be passed in an action metadata message 400 may or may not be included in a content portion message 402. The content portion message 402 may further include content portion data 452a and an end-of-message identifier 432. In some embodiments, some or all of the content portion message 402 may be encrypted.

The content portion message 402 may further include a content portion 452a and an end of message identifier 432. A content portion 452a may be data representative of a part of the content being shared, and may be any size. According to some embodiments, the content portion may be a size on the order of 10's or 100's of kilobytes. In some implementations, a content portion 452a may be about 64 kB in size.

Figure 5A:
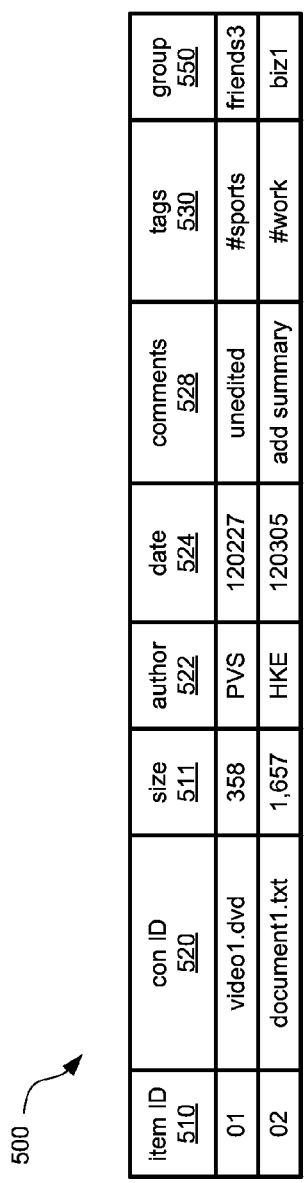
FIG. 5A depicts an action database data structure, according to one embodiment.
Figure 5B:
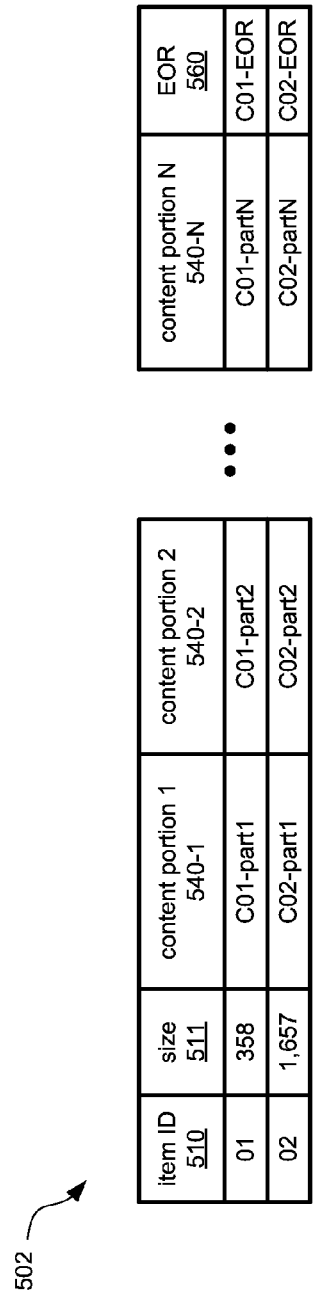
FIG. 5B depicts an object database data structure, according to one embodiment.

According to some embodiments, each device 105i configured for content sharing may be adapted to maintain an action database 500 and an object database 502, depicted according to one embodiment in FIGS. 5A-5B. Action databases may be used to keep records of shared content and information associated with the content. Action databases may provide searchable data records. Action databases maintained by a device 105i, may be a copy of a portion of a system-wide action database maintained by content share servers 120. An action database 500 for a device 105i may be associated with content of a device 105i that is identified for sharing and/or has been received by the device.

The action database 500 may comprise a data structure in the form of a table or record of content shared with members in one or more share groups. Some or all of the entries in an action database action item may be included in an action metadata message 400 generated by a sharing device 105i. System-wide action and object databases may also be maintained by content share servers 120 and/or super data nodes 110. A local action database 500 and/or a local object database 502 that is maintained by a device 105i may be a replica of a portion of an action database and/or object database maintained by a content share server 120i and/or super data node 110i.

According one embodiment as depicted in FIG. 5A, an action database 500 may comprise a plurality of action items, each containing information associated with shared content. An action item may comprise a row of data fields. An action database 500 may include one or more action item identifiers 510 and corresponding one or more content identifiers 520. The content identifiers may identify the particular content to be shared with a share group member. The content identifier may be a file name, a path and file name, one or more pointers to an address where data to be shared is located, etc. In some embodiments, a content identifier 520 may include a unique content identifier described above. The content-sharing system may manage and track content by referencing the unique content identifier, and devices 105 may be configured to display file names associated with the content rather than displaying the unique content identifier.

The action database may include, in separate data fields, additional information associated with content to be shared. The additional information may include a total bit size 511 of the content, an author 522 or originator of the content, an origination and/or modification date 524 of the content, comments 528 associated with the content that may have been added by a user, and one or more tags 530 associated with the content that may have been added by a user. In some embodiments, any number of content tags may be associated with content. The information associated with content may further include a group 550 identifier that identifies one or more groups with which the content is shared. Content from one action item may be shared with more than one group.

Whenever a particular content is identified to be shared, a row entry may be generated in the action database 500 as an action item for the sharing of the content. The action item may be queued for generation of an action metadata message 400. After generation and transmission of the action metadata message, the associated action item may be modified and or updated with information provided from a content share server 120i, e.g., updated to include a unique content identifier. In some embodiments, an action item may be deleted from the action database 500 after transmission of an action metadata message and replaced with information provided by a content share server that corresponds to the action item. In some implementations, an old and unused action item may be deleted from the action database 500 under certain conditions, e.g., if all tags have been removed from the action item entry. In some embodiments, action items are stored indefinitely by one or more content share servers 120, one or more super data nodes 110, and/or one or more devices 105.

A sharing device 105i may also be configured to maintain an object database 502, which may be a data structure associated with content to be shared. The object database 502 may include a plurality of row entries corresponding to action items in the action database 500, as depicted in FIG. 5B. Each row entry may comprise a plurality of data fields. The object database 502 may include an item identifier 510 that may be the same as or correspond to an action item identifier 510 in the action database 500. In some implementations, an item identifier 510 in either or both databases may comprise a pointer or address identifying a location of data within the other database.

An object database 502 may further include a data field 511 representing a total size of the content, and content portions 540-1, 540-2, . . . 540-N, or identifiers as to where the content portions are located. In some embodiments, the content portions may comprise pointers or addresses as to where portions of the content to be shared is located. In some implementations, the object database 502 may further include a status entry (not shown) for each content portion and/or total content that indicates a transmission status of the content portion or total content, e.g., pending, transmitting, successful transmission, failed transmission. The object database 502 may further include an end-of-record 560 for each entry in the object database. According to some embodiments, a row entry in an object database 502 may be generated by a sharing device 105i responsive to the identification of content to be shared.

According to some embodiments, a sharing device 105*i* may further be configured to maintain a separate "send" and "receive" action item database and object database similar to those described above in connection with FIGS. 5A-5B. The receive action item and object databases may be used to keep track of content that is being shared with the sharing device, e.g., to be or being received from another device. The send action item and object databases may be used to keep track of content that is being shared with or sent to one or more other devices. In some embodiments, a single action item database and a single object database may be used at a device 105*i* to keep track of outgoing content and incoming content. In some cases, a data field may be included in each database row to identify the content or associated data as pertaining to outgoing content or incoming content.

In various embodiments, a super data node 110*i* may be configured to maintain an object status database that indicates the status of content managed by the super data node. FIG. 5C illustrates one example of an object status database 506. The object status database may be used by the super data node 110*i* and/or content share server to determine availability of content portions, either at the super data node or at a device 105*i* downloading the content portions. An object status database may comprise a data structure in table form or a record that is actively updated to reflect the status of content managed by the super data node. According to some embodiments, an entry in the object status database 506 may include a content or item identifier 510. The identifier 510 may be the same as or correspond to an action item identifier 510 generated for the action database 500 of the sharing device. In some embodiments, an item identifier 510 may be the unique identifier that is associated with a particular content to be shared.

An entry in the object status database may further include a status indicator 570. The status indicator may provide information about the status of content being managed by the super data node 110*i*. Various status indicators may include "complete," "partial," "uploading," and "downloading." "Complete" may be used to indicate that all portions of a content to be shared have been uploaded to the super data node. "Partial" may be used to indicate that only part of the entire content to be shared was successfully uploaded. "Uploading" and "Downloading" may be used to indicated that the super data node is currently uploading or downloading portions of the content. Other status indicators may be used in some embodiments. For example, a status indicator of "Deleted" may be used to indicate that the content was previously available from the super data node, but has been deleted or moved to a different location. It will be appreciated that status indicators can be in the form of alpha-numeric codes or descriptive character strings in some implementations.

An entry of the object status database may further comprise statistics data 580 relating to the content to be shared. As one example, statistics data may indicate the number of share group members to which the content has been successfully downloaded. The statistics data may also indicate the total number of members in a share group. In some embodiments, the statistics data 580 may include a date and/or time at which one or more portions of the content have been last downloaded. In some cases, the statistics data 580 may include a date and/or time at which the content was first made available for sharing. The statistics data may provide information useful in evaluating the efficiency of the super data node and for determining when to remove content to be shared from the super data node 110*i*.

An object status database 605 may include addition information in some implementations. A row entry in the database may include the number and/or address(es) of additional super data nodes 110 that share the same content identified by the item identifier 510. In some implementations, an entry of the object status database may further include authorization information (not shown in FIG. 5C). Authorization information may identify which of the devices 105 are authorized to retrieve a copy of the content.

Content share servers 120 may be configured to maintain one or more databases that are used to record and manage content sharing within the system 100. Examples of databases that may be maintained by the content share servers can include action and object databases as described above, or a combination database thereof. However, for a content share server, action and object databases may contain system-wide records of action items and objects shared. Databases maintained by a content share server may provide a comprehensive historical reference that is useful for searching and retrieval of content. In some implementations, a content share server generates action databases 500 for a device 105*i* and provides the action database to the device as action items are added, removed, or updated. An action item may be removed from a database, for example, if all document content tags are removed from the action item.

Figures 6A, 6B:
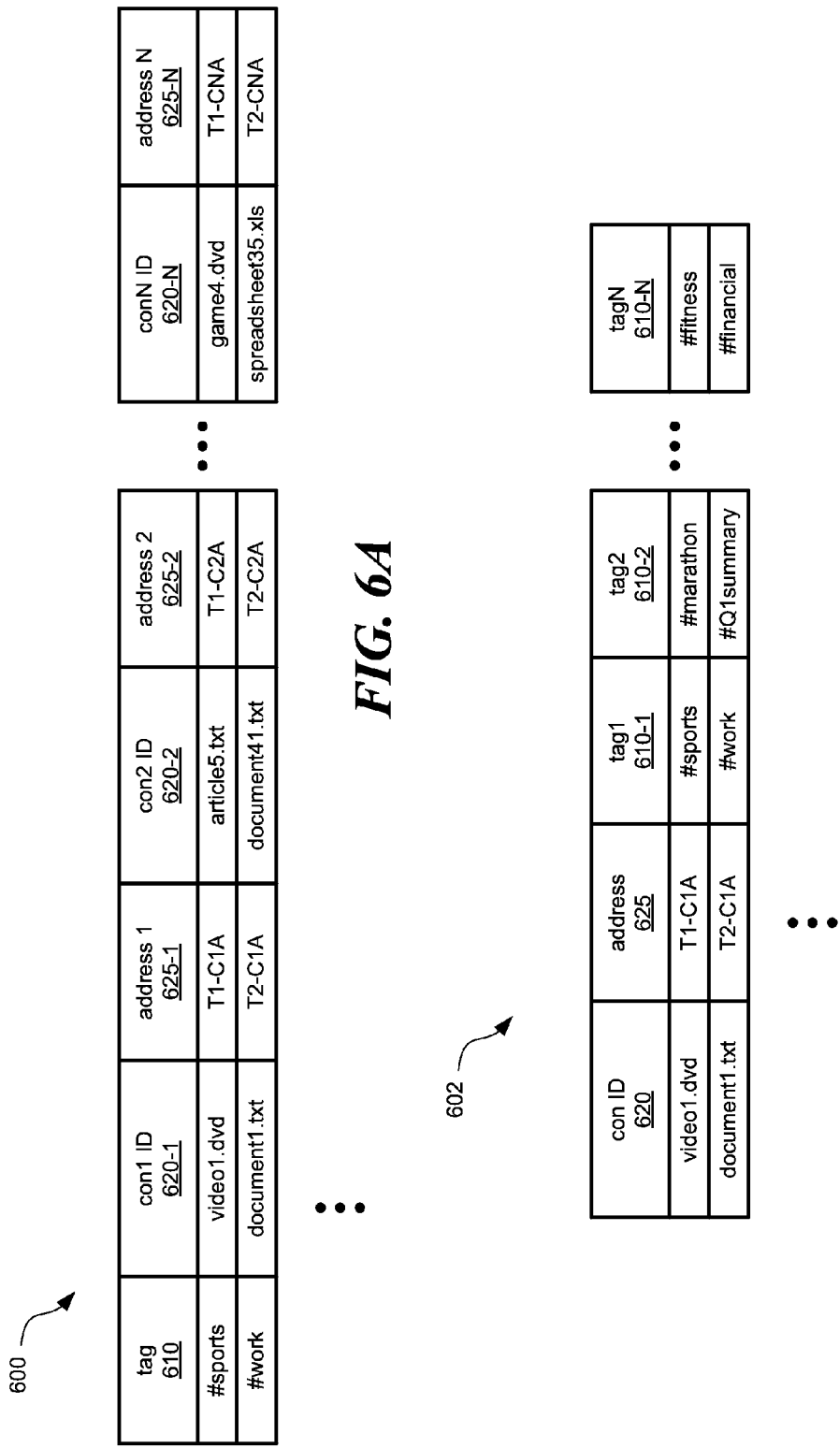
FIG. 6A depicts a tag database data structure, according to a first embodiment.
FIG. 6B depicts a tag database data structure, according to a second embodiment.

Content share servers 120 may maintain additional databases, such as the content tag databases illustrated in FIGS. 6A-6B. A content tag database may be maintained by a content share server 120*i* for purposes of providing search-related functions. For example, a user of the content share system may execute a search for content associated with a content tag. One example of a content tag database 600 is depicted in FIG. 6A, and may comprise a data structure in table or record form. An entry in the content tag database 600 may include a content tag identification 610 along with a list of content identifiers 620-1, 620-2, . . . 620-N that identify content items that have been associated with the content tag. For each content, there may be a respective address identifier 625-1, 625-2, . . . 625-N identifying one or more addresses at which a copy of the content may be found. Another example of a content tag database 602 is depicted in FIG. 6B. According to this embodiment, an entry in the database may comprise a content identifier 620, and address identifier 625, and a list of content tags 610-1, 610-2, . . . 610-N that have been associated with the content. In some implementations, a content tag database may include one or more data fields that identify users that are authorized to view or receive content associated with a content tag. According to some embodiments, content tags, associated content identifiers, and content information may be maintained in relation database structures employing any suitable schema.

III. Example of System Operation

In operation and referring again to FIGS. 1A-1B, the super data nodes 110, at least one content share server 120*i*, and selected devices 105 may be particularly adapted with machine-readable instructions to execute methods of content sharing and synchronization between devices 105 over a network 101 without requiring large amounts of network or cloud storage. Further, aspects of content sharing and synching may occur automatically, in some implementations, without interaction by a user of a device 105*i*. According to some embodiments, the content-sharing system further provides for content tagging and commenting of the shared content, and for various content tag functionality.

Once content is designated for sharing, a first sharing device 105*a* may be adapted to automatically generate and transmit, alone or in cooperation with a content share server 120*i*, an action metadata message 400 to one or more members of a share group responsive to the user identifying the content to be shared. The generation and transmission of the action metadata message may occur without any user interaction, in some embodiments. In some embodiments, the device 105a may be adapted to notify the user and/or obtain user permission to transmit the action metadata message. The action metadata message may be transmitted over the network 101 to be received by devices 105c and 105d of a share group to which sharing device 105a belongs. The dashed lines in FIGS. 1A-1B indicate routes for action metadata messages.

According to some embodiments, action metadata messages 400 are not transmitted to or from super data nodes 110. The action metadata messages 400 may be routed to share group members via a content share server 120i without passing through the super data nodes 110. As noted above, a content share server may process an action metadata message, generate additional action metadata messages for members of a share group, and record information associated with the action metadata message that may be used for subsequent system functionality, e.g., searching of shared content, updating local action database records, etc.

Content indentified in an action metadata message 400 may be transmitted to members of a share group as content portion messages 402. Content portion messages 402 may be routed to and from super data nodes 110, as indicated by the solid lines in FIGS. 1A-1B, and may not route through a content share server 120i. Content portion messages 402 may also be routed to share group members from a sharing device if the share group members are concurrently on line with the sharing device. In some embodiments, super data nodes may be configured to receive, process, and transmit action metadata messages in addition to content portion messages.

Each receiving device 105c, 105d may process its action metadata message 400 to obtain address information (e.g., internet addresses or address identifiers) identifying one or more resources on the system 100 from which to obtain the content to be shared. A receiving device may then contact the one or more resources to obtain a copy of the content and receive content portion messages 402. After obtaining all content portions, from one or more resources, the receiving device may update local databases with information associated with the shared content and may end processing associated with the action metadata message.

According to some embodiments, the notification of content to be shared is driven by a sharing device and content share server. Transfer of the content may be driven by each receiving device, that must contact one or more resources to obtain the content. Content portion messages may be received concurrently from a plurality of resources.

IV. Method Embodiments

Various methods are associated with the content-sharing system and devices adapted for content sharing. FIGS. 7A-7C and 8A-8B illustrate acts that may be included in one or more embodiments of methods for content sharing between a plurality of devices. The acts shown in the drawings may not all be included in various embodiments of methods for content sharing. Some embodiments may only include a subset of the acts shown. Some embodiments may include additional acts not shown in the drawing, but described herein. Methods of content sharing are not intended to be limited to only the acts as shown.

According to one embodiment, a method of sharing content between a plurality of devices adapted to communicate in a data communications network may comprise a process 700 for receiving an action metadata message and content at a first device 105c, a receiving device, that is made available by a second device 105d, a sharing device, for sharing with the receiving device. The process 700 may comprise receiving 710, at the receiving device 105c of a plurality of devices, an action metadata message 400. The action metadata message may identify content of a sharing device 105d to be shared with the receiving device. The action metadata message may include an address identifier that may be used by the receiving device to identify at least a first internet address for accessing the content at the sharing device and at least a second internet address for accessing a copy of the first content at a data-storage node in the network, e.g., a super data node 110i.

In some embodiments, the receiving device 105c may be configured (e.g., via a user setting) to notify 714 the user of received action metadata messages and obtain user approval 716 before taking further action with the message or certain predefined actions, e.g., index the content but do not download without user permission. If it is determined, by the receiving device, that a user prompt for a received action metadata message is required 712, the device may then notify 714 the user with a visual, audio, or tactile notification, and await user approval. If user approval is not received 716, then the receiving device 105c may wait 718 for a period of time and check again to determine if user approval has been received. If a positive indication of approval is received 716, then the action metadata message may be processed 720.

In some embodiments, the receiving device 105c may be configured such that user prompting and approval are not required to process an action metadata message. If it is determined, by the receiving device, that a user prompt for a received action metadata message is not required 712, then the action metadata message may be processed 720 by the receiving device.

Processing 720 of the action metadata message 400 by the receiving device 105c may comprise parsing the message to obtain information from the message header 410, content identification 420 identifying the content to be shared, any content information data 423 that may be associated with the content, and address information 425 that may be used to identify one or more resources in the network where the content may be accessed and retrieved. In some implementations, the sending and/or receiving device may be further configured to generate and populate data fields for row entries in action and/or object databases 500, 502 that are described above. The action and/or object databases may be used by the receiving device to keep track of the status of content that may be downloaded to the receiving device. The generation and population of the data fields for the action item and/or object databases may occur at any time after the receipt of an action metadata message 400.

According to some implementations, action and/or object databases may be updated at sending and receiving devices 105 with information provided to the sending and receiving devices from a content share server 120i. For example, a content share server may provide information to populate an action database and/or object database to both sending and receiving devices after a content share server processes an action metadata message 400. The content share server may update its own action database, and additionally provide information to members of a share group, including the sharing device, identified in the action metadata message 400, so that each member can update its own action database. In this manner, action databases and/or object databases can be synched system-wide.

In some embodiments, the receiving device 105c may be configured (e.g., via a user setting) to notify 724 the user of a pending retrieval of content and obtain user approval 726 before downloading the content. If it is determined, by the receiving device, that a user approval for retrieving content is required 722, the device may then notify 724 the user with a visual, audio, or tactile notification, and await user approval. If a negative indication of approval is received 726, then the content may not be retrieved and local databases maintained by the device 105c may be updated 728 to reflect the processing of the action metadata message and any action (e.g., refused retrieval of content, updating a comment, updating content tag information) taken associated with the action metadata message. If a positive indication of approval is received 726, then the receiving device 105c may proceed to retrieve 727 content portions from one or more devices 105 and one or more super data nodes 110. If it is determined, by the receiving device, that a user approval for retrieving content is not required 722, then the receiving device 105c may proceed to retrieve 727 content portions from one or more devices 105 and one or more super data nodes 110.

In some embodiments, the receiving device 105c may issue 730 a request to a content share server from which it received the action metadata message 400, or to a super data node identified in the action metadata message, to obtain address information, e.g., internet addresses and port numbers identifying which devices 105 and which super data nodes 110 maintain copies of the content identified in the action metadata message or associated content portions. A request may be issued if an action metadata message does not contain sufficient address information (e.g., internet addresses and optionally port numbers) of devices and super data nodes having the content identified in the action metadata message, or if the receiving device 105c is unable to retrieve all content portions from devices 105 and super data nodes 110 previously identified as having the content. In some implementations, a receiving device may regularly issue 730 a request for address information, even though the device may be currently downloading content portions from one or more devices. For example, a receiving device 105c may continue to obtain address information of other network resources having the content so that one or more additional channels can be opened for retrieving content portions.

In response to the issued request, the receiving device 105c may receive internet address information identifying resources in the network from which it may retrieve 727 content portions. Since a device 105i may download content as content portions from multiple sources, a resource in the network (e.g., a device or super data node) need not have an entire copy of the content prior to a receiving device 105c retrieving content portions from the resource. For example, a receiving device could begin retrieving 727 content portions from a network resource prior to the resource having a complete copy of the content.

According to some embodiments, a content share server 120i may identify in the action metadata message 400 all devices 105 and super data nodes 110 that currently maintain copies of the content or associated content portions identified in the action metadata message. For example, the address information data field 425 of the action metadata message may include internet addresses and optionally port numbers of one or more network resources having the content. In such embodiments, a receiving device 105c may begin retrieving 727 content portions, e.g., connecting 740 to one or more super data nodes 110 and/or connecting 750 to one or more devices 105 without issuing 730 a request for address information. In some embodiments, a connection with a resource apparatus (device 105i or super data node 110i) may be executed automatically without interaction from the user of the receiving device 105c. Further, the connection may occur automatically without interaction by a user of a resource apparatus. As noted above, the number of connections established by a receiving device 105c may be dependent upon the processing power and/or speed of the receiving device.

In some embodiments, an action metadata message 400 may contain very little information and not all of the data fields shown in FIG. 4A. For example, an action metadata message may contain a short header 412 (e.g., identifying the length and type of message—an action metadata message), and identify a content share server sending the message. The message may further contain a message identifier that may or may not be unique, and that may be used as a reference to link to other information retained by the content share server. In some implementations, the message identifier may comprise a unique content identifier 420. A receiving device may process the action metadata message an issue 730 a request to the content share server identified in the message. The request may include the unique content identifier and the unique device identification number. A content share server may then provide a response to the request that includes a most current content information data field 423 and a most current address information field 425. The device may process the response and use the information provided therein to retrieve content from one or more resources in the network.

When address information of network resources having the content becomes known to the receiving device 105c, the receiving device may attempt connecting to one or more super data nodes 110 and/or one or more devices 105, which may include a sharing device 105d. If it is determined that the sharing device is on line, the receiving device may first attempt connecting 750 with the sharing device 105d, following a method as depicted in FIG. 7C, for example. In some embodiments, the receiving device 105c may first attempt connecting 740 with a super data node, following a method as depicted in FIG. 7B, for example.

Figure 7A:
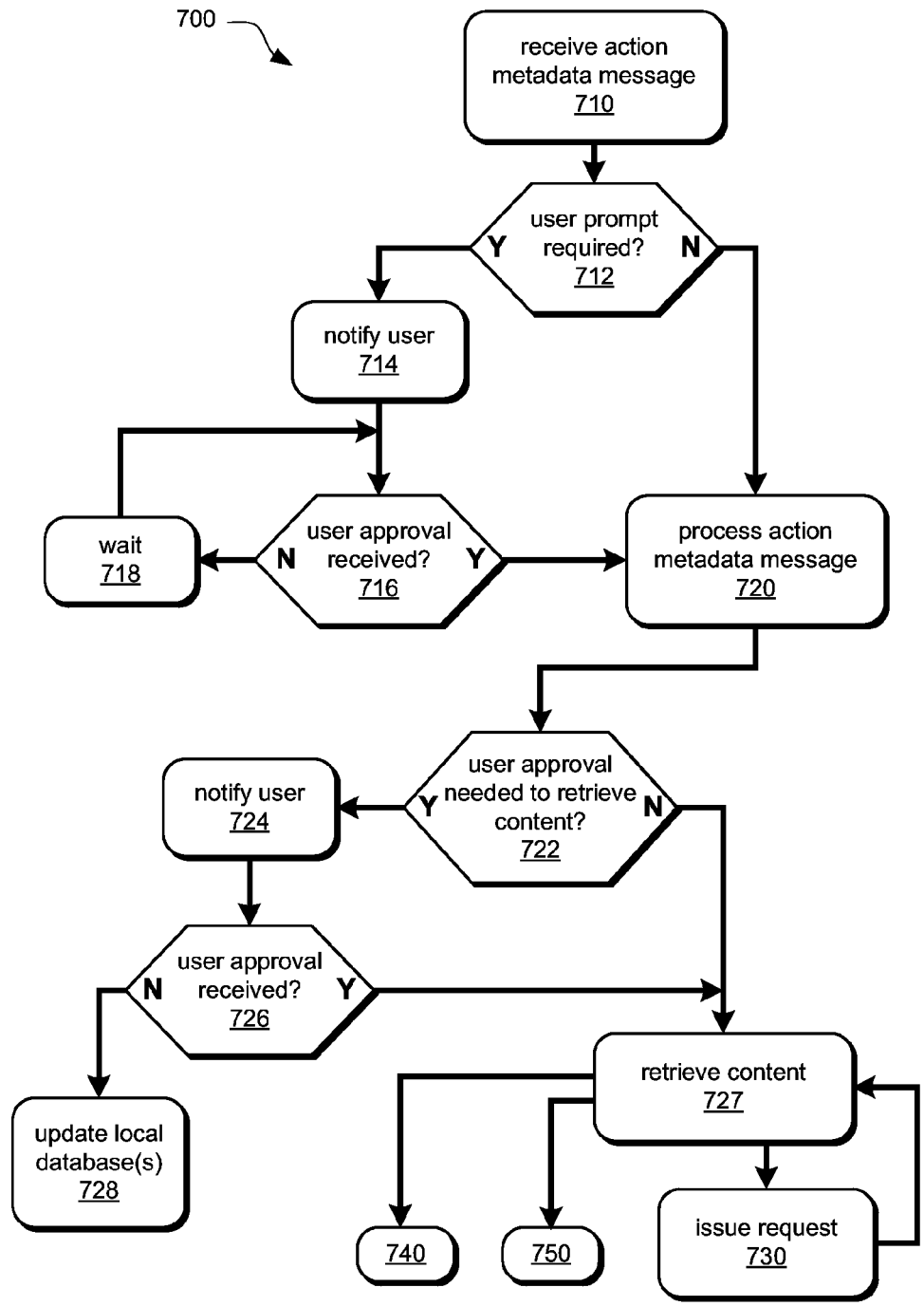
FIGS. 7A-7C depict a method of content sharing, according to a first embodiment embodiment.
Figure 7B:
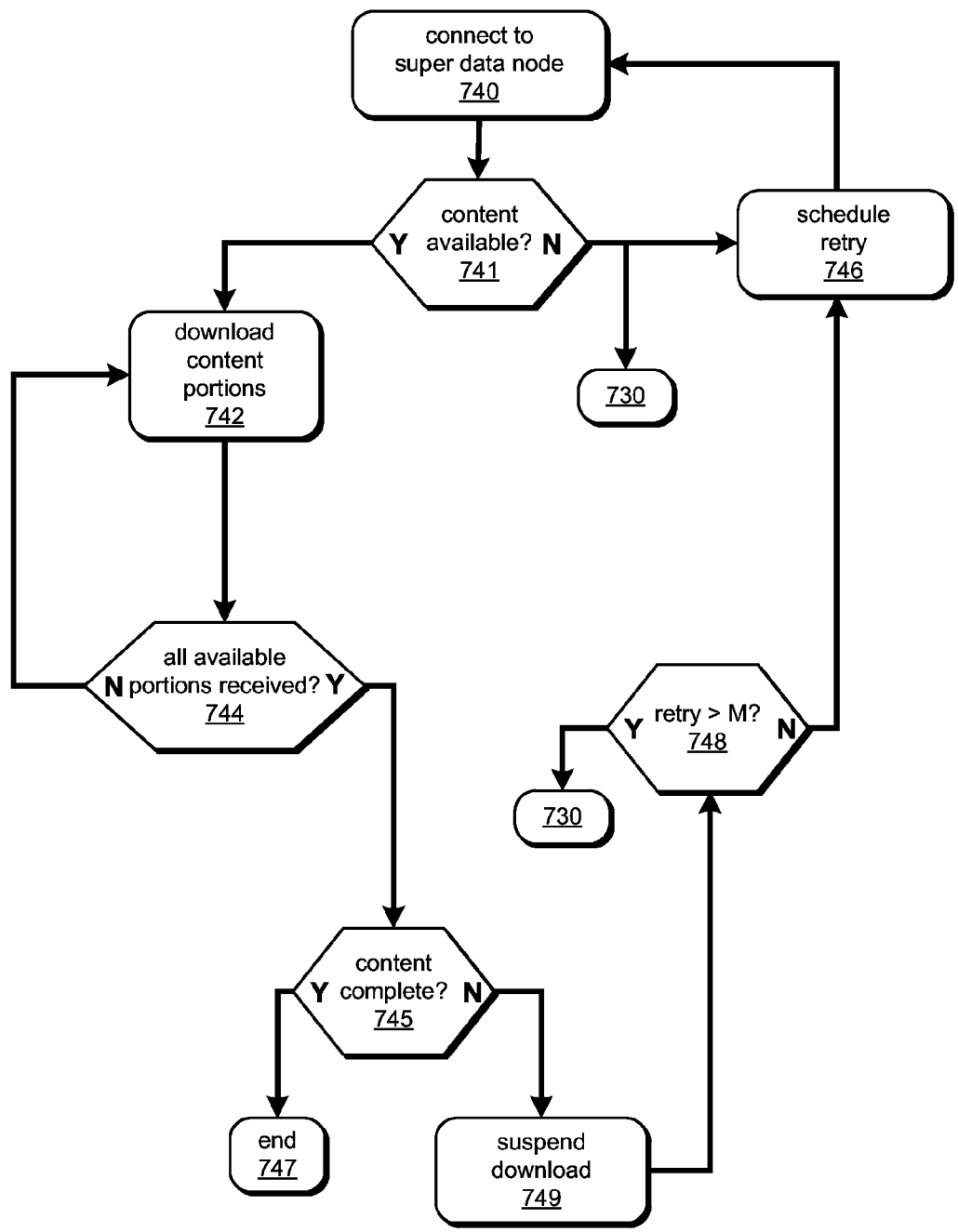
Figure 7C:
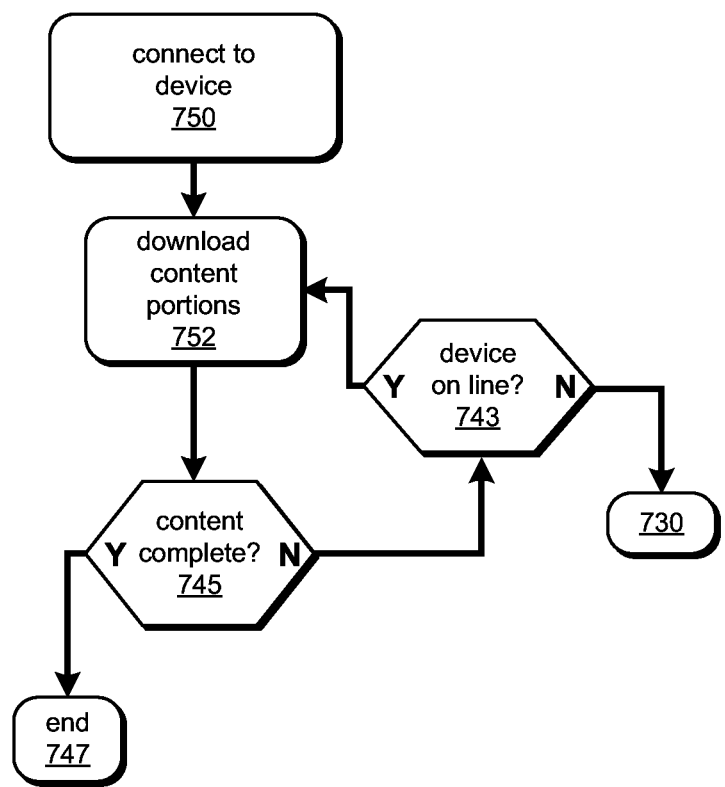

Referring to FIG. 7B, connecting 740 to one or more super data nodes by the receiving device may be carried out using standard or proprietary network communication protocols. In some embodiments, a supper data node may restrict communications with the super data node to only devices 105 that are authorized to communicate with super data node. In some implementations, connecting 740 to a super data node may require authentication of a device 105i attempting to connect with the super data node.

When connected to a super data node 110i, the receiving device 105c may request the content identified in an associated action metadata message 400. For example, the receiving device may provide to the super data node a content identifier parsed from an action metadata message that identifies the content to be shared. The super data node may indicate whether the content is available or not, and the receiving device may determine 741 whether the content is available at the super data node. If the content is not available at the super data node, the receiving device may schedule 746 a re-attempt to connect to and retrieve content from the super data node at a later time.

The receiving device may also be configured to issue 730 a request to a content share server 110i that sent the action metadata message 400 to the receiving device 105c. The request may be issued responsive to the receiving device determining 741 that content is unavailable at the super data node identified in the action metadata message. The receiving device may be configurable to issue 730 the request after a selected number of failed attempts at retrieving content from the super data node 110i. For example, the machine-readable instructions that adapt a device 105i for content sharing may include instructions that allow a user to select a setting that identifies when a request will be issued 730 responsive to failed attempts at retrieving content from a super data node. The instructions may also include provisions for user selection of a time delay associated with retrying 746 to connect and retrieve content from a super data node.

If the content is available at the super data node 110i, the receiving device may begin downloading 742 content portions 402. The downloading of content portions may include parsing the content portions to obtain header information 412, a content portion identifier 450 and content portion data 452a. In some embodiments, the downloading 742 may include decrypting the content portion messages 402. In some embodiments, content portions 402 may be downloaded from a super data node before the super data node receives all portions associated with a particular content from a sender. This is possible in the various embodiments, since the content to be shared may be divided into content portions 540. This can enable more rapid access and exchange of data, since the uploading to a super data node and downloading to a share group member need not be a sequential process.

In some implementations, all content portions of a particular content may not be uploaded to a super data node. In some circumstances, a connection failure may result in incomplete uploading of all content portions to the super data node 110i. As a result, a receiving device may not be able to obtain all content portions associated with content identified in an action metadata message.

The receiving device may further be configured to determine 744 whether all content portions associated with the content identifier received in the action metadata message and available from the super data node have been received. If it is determined 744 that all available content portions at the super data node have not been received, then the process may return to downloading 742 content portions. If it is determined 744 that all available content portions 402 associated with an identified content have been received from a super data node, the receiving device may determine 745 whether the received content portions are complete, e.g., an accurate representation of the identified content intended to be shared. In some embodiments, the determination may be by data size. For example, the receiving device may receive an indication of the total content size in the action metadata message, and check the total content size against the size of data downloaded from the super data node. If it is determined 745 that the downloaded content portions are accurately representative of the complete content, the process 700 may end 747. In some instances, ending 747 the process may comprise updating and/or removing data fields in associated action item and object databases to reflect any changes associated with the downloading of the content.

If it is determined 745 that the downloaded content portions do not represent the complete content, then the receiving device 105c may suspend 749 further downloading actions. Suspension of downloading 749 may comprise taking no further action with respect to the super data node from which content was being downloaded. In some embodiments, the receiving device may issue (not shown) a "missing content" message to the super data node 110i and/or a content share server 120i that identifies the content for which one or more portions are missing, and may also identify content portions that are missing. Responsive to receiving the missing content message, the super data node or content share server may issue a request to the sender to "re-share" the content.

In some embodiments, if it is determined 745 that the downloaded content portions do not represent the complete content, then the receiving device 105c may determine 748 whether a number of attempts that have been made to retry obtaining content from the super data node and or other resources who have or may have the content exceed a pre-selected value M. M may be any integer or non-integer value less than 50 in some embodiments. If a number of retries does not exceed M, the receiving device 105c may schedule 746 a re-attempt to connect to and retrieve content from the super data node. If the number of retries exceeds the pre-selected value M, the receiving device 105c may be configured to return to issuing 730 a request to obtain information as to where the content might currently be available on the network. In some embodiments, the device may further be configured to identify in the issued request that the super data node does not retain the content or all content portions associated with the content.

As noted above, even though a receiving device may be connected to and downloading content portions from one network resource, the receiving device 105c may, on a regular and concurrent basis, issue 730 requests for information about other network resources that may have the content and/or attempt connecting 740, 750 to additional network resources that have at least some content portions associated with the content identified in an action metadata message 400 that identified the content to be shared. In some implementations, a receiving device 105c may be configured to establish connections for retrieving content portions in a pre-selected order, e.g., super data nodes first, sharing device second, other devices last. The pre-selected order may be set by a user of a device 105i, or may be a default order. The order may be based on one or more factors and may change in real time, e.g., be based on geographic location, speed of apparatuses, local traffic handled by an apparatus, security, etc.

When downloading content portions from multiple network resources, acts of downloading may include coordinated management of the downloading so that a same content portion is not downloaded from two resources. For example, a device may track content portions being downloaded by their content portion identifiers and prohibit duplicative downloading of same portions of content. In some embodiments, a receiving device may only request specific and non-identical content portions from two or more network resources.

Referring to FIG. 7C, a receiving device 105c may be configured to connect 750 with other devices 105 on line concurrently with the receiving device and to additionally or alternatively download content portions from these devices that may possess the content portions. The other devices 105 may include the sharing device 150d that identified the content for sharing and originated the action metadata message 400 for sharing the content.

When a connection has been established between a receiving device 105c and another device 105i, then the receiving device may download 752 content portions from the other device 105i. The receiving device may be configured to determine 745 whether the downloaded content portions represent the complete content to be shared. If it is determined 745 that the downloaded content is complete, the process 700 may end 747.

In some embodiments, the receiving device 150c may be further configured to determine 743 whether the other device 105i remains on line concurrently with the receiving device as data is being downloaded 752. If the other device goes off line, the receiving device may return to the act of issuing 730 a request for information identifying other network resources that may have the content. If the receiving device is concurrently downloading content portions from another device and/or super data node, then the receiving device may not issue 730 a request for address information.

Figure 8A:
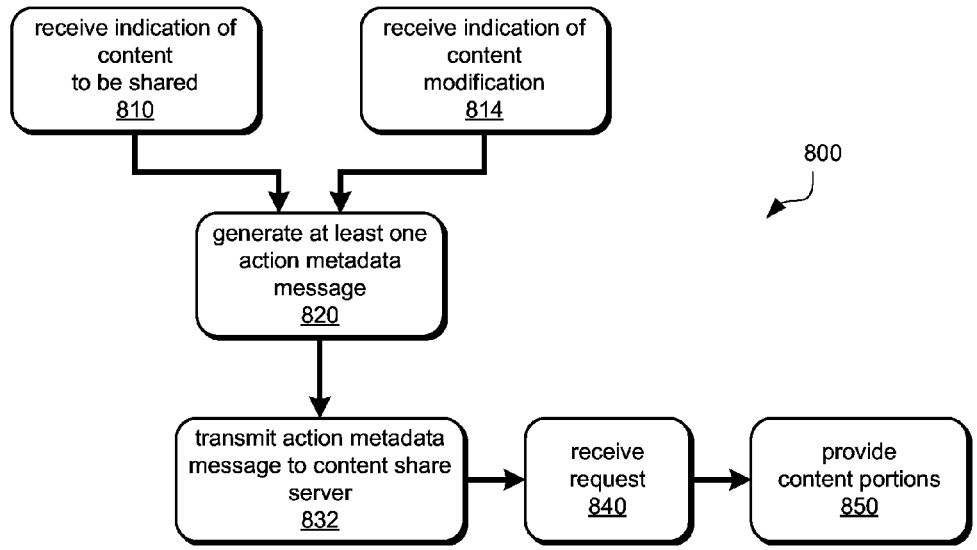
FIGS. 8A-8B depict a method of content sharing, according to a second embodiment.

Referring to FIG. 8A and according to some embodiments, the receiving device 105c may be further configured to execute one or more acts in a sharing process 800 in addition to or in combination with one or more of the acts in a receiving process 700. The device 105c may be configured, for example, to receive 810 an indication of content to be shared. The indication may be a result of a user action, e.g., a user designating content to be shared with one or more members of a share group. The device 105c may also be configured to receive 814 an indication that content identified for sharing has been modified. A modification of the content can include a modification to the content data itself (e.g., editing the content), a modification to metadata associated with the content (e.g., adding or changing content tags associated with the content), or adding or changing a comment associated with the content.

Receipt of an indication of content to be shared or of content modification may cause the device 105c to generate 820 at least one action metadata message, for notifying each member of a share group with whom the content will be shared, that identifies content available for sharing. The generation of the action metadata message may be automatic and without any interaction from a user. In some embodiments, the device 105c may be configured to issue prompts to the user prior or subsequent to the generation of an action metadata message. In some implementations, a user may set rules on the device 105c that determine a frequency with which action metadata messages are generated. For example, a user may set a rule that permits generation of action metadata messages according to a temporal schedule, e.g., every 30 minutes, every hour, every 15 minutes, every day, etc. As another example, a user may set a rule that permits generation of action metadata messages only after completion of a session of editing or modifying a document, e.g., when the document is save and/or closed. In some implementations, the generation 820 of an action metadata message may include generating and populating data fields in action item and object databases 500, 502 maintained by the device 105c.

In some embodiments, a generated action metadata message may be transmitted 832 to a content share server 120i and/or a super data node 110i. The content share server may then process the action metadata message and transmit modified versions of the message to members of the share group. The transmission of action metadata message by the device 105c may be done automatically and without interaction from a user of the device 105c in some embodiments.

After transmitting the action metadata message, the device 105c may receive 840 a request from one or more super data nodes and/or one or more devices for the content identified in the action metadata message 400. Responsive to receiving the request, the device 105c may provide 850 content portions to the one or more super data nodes 110 and/or one or more devices 105. The providing 850 of content portions may comprise transmitting content portion messages 402 to a super data node or device requesting the content identified in the action metadata message 400.

Figure 8B:
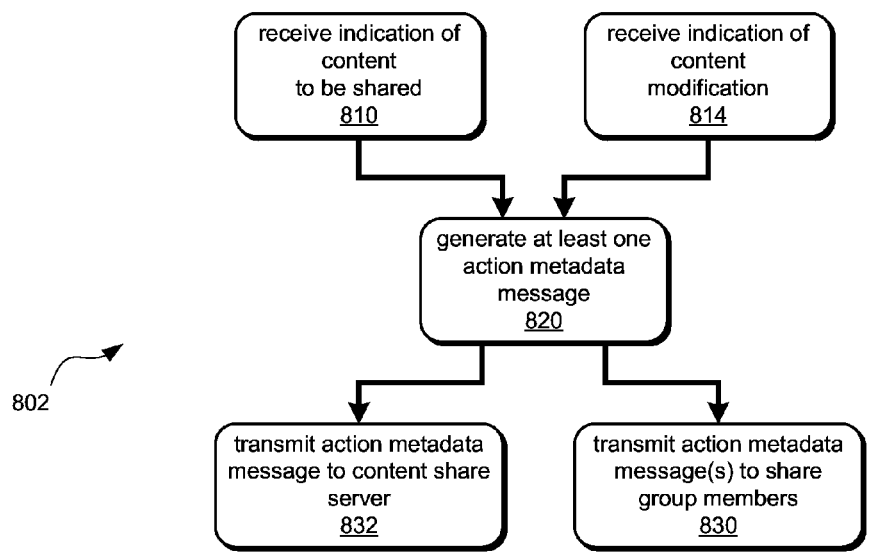

An alternative embodiment of a process 802 for sharing content by a device 105i is depicted in FIG. 8B. Steps that are common to both the embodiments of FIGS. 8A and 8B have the same numbers. In the sharing process of FIG. 8B, a device 105c may be further configured to transmit 830 one or more action metadata messages to one or more members of a share group directly, e.g., without the messages being routed through a server. The device 105c may additionally transmit 832 a corresponding action metadata message to a content share server that identifies or is associated with the same content identified in the action metadata messages sent directly to the share group members. The message sent to the content share server may allow the content share server to update its databases, so as to maintain an accurate system-wide databases. In some embodiments, after each device in a share group receives its action metadata message, each device may contact the content share server, e.g., issue 730 a request, to determine what network resources have the content or content portions.

In various embodiments, a device 105c that is configured to share content may be configured to prepare content identified for sharing in portions for transmitting as content portion messages. The preparation of the content portions may occur at any time. For example, the preparation of the content portions may occur as soon as content is associated with the content-sharing system, e.g., placed in a content sharing file. In some embodiments, preparation of content portions may occur just before or just after generation 820 of an action metadata message. In some implementations, preparation of content portions may occur whenever content is identified for sharing, e.g., whenever an action indicates 810 the content is to be shared, or whenever an action indicates 814 that previously shared content has been modified. The preparation of content portions may include packaging the content portions into a content portion message.

According to some embodiments, a device 105i may receive a request (not shown), at any time from a share group device 105i, a content share server 120i, or a super data node 110i to re-share content previously shared. A "re-share" request may occur if a share group member is unable to retrieve content or all content portions of a content identified for sharing from resources on the network. A device may be unable to retrieve content or content portions if the content and/or content portions have been deleted from super data nodes and members of the share group are off line. Responsive to receiving a re-share request, a device 105i may re-share the content by generating 820 an action metadata message 400 associated with the content, and executing additional sharing steps as described above. The generation of the action metadata message can result in reloading of the content at a super data node.

In various embodiments, any device 105i in the content-sharing system may have the right to delete content that has been shared with the device. According to some embodiments, deleted content is placed into a pseudo-trash receptacle at the device that deleted the content. In the pseudo-trash receptacle, the content may remain, at least temporarily, available for other share group members to retrieve. The content may remain in the pseudo-trash receptacle on a similar or different temporary basis used for the super data nodes. In some embodiments, the device 105i may further be configured to automatically generate a "deletion" action metadata message 400 that is directed to members in the share group and notifies the members and at least one content share server 120i that the content has been deleted by the device, or at least moved to the pseudo-trash receptacle.

V. Conclusion

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, system upgrade, and/or method described herein. In addition, any combination of two or more such features, systems, and/or methods, if such features, systems, system upgrade, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention, e.g., content share server 120i, super data node 110i, may be embodied and/or implemented at least in part as a computer readable storage medium (e.g., a computer memory, one or more floppy discs, compact discs, optical discs, magnetic tapes, flash memories, circuit configurations in Field Programmable Gate Arrays (FPGAs) or other semiconductor devices, or other tangible computer storage medium or non-transitory medium) encoded with one or more programs that, when executed on one or more computers or other processor(s), perform methods that implement the various embodiments of the technology discussed above. The computer readable medium may be transportable, such that the program or programs stored thereon can be loaded onto one or more different computers or other processors to implement various aspects of the present technology as discussed above. In some embodiments, processing of data and system operation may be implemented entirely, or at least in part, in FPGAs.

The terms "program" or "software" are used herein in a generic sense to refer to computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The terms "about," "approximately," and "substantially" may be used to refer to a value, and are intended to encompass the referenced value plus and minus variations that would be insubstantial. The amount of variation could be less than 5% in some embodiments, less than 10% in some embodiments, and yet less than 20% in some embodiments. In embodiments where an apparatus may function properly over a large range of values, e.g., one or more orders of magnitude, the amount of variation could be a factor of two. For example, if an apparatus functions properly for a value ranging from 20 to 350, "approximately 80" may encompass values between 40 and 160.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of sharing content between a plurality of devices adapted to communicate in a data communications network, the method comprising:
   receiving an indication, at a first device of the plurality of devices, of an association of a first content tag with a first content stored on the first device, wherein the first content has been designated to be shared with at least one second device of the plurality of devices;
   generating, at the first device without interaction from a user, a first action metadata message that identifies the first content to be shared with the at least one second device;
   transmitting, by the first device without interaction from the user, the first action metadata message directed to the at least one second device, wherein the generating and transmitting are executed automatically responsive to the association of the first content tag with the first content;
   transmitting automatically, by the first device and responsive to receiving the indication, a notification directed to a super data-storage node in the data communications network, the notification informing the super data-storage node that the content is available at the first device for transmission to the super data-storage node;
   receiving, at the first device, a second action metadata message from one device of the at least one second device of the plurality of devices, wherein the second action metadata message identifies a second content that has been associated with the first content tag by the one device;
   processing, automatically and without interaction from the user, the second action metadata message to identify at least one address from which the second content may be retrieved; and
   retrieving, automatically and without interaction from the user, at least portions of the second content from the at least one address.

2. The method of claim 1, wherein the first content tag is descriptive of the first content.

3. The method of claim 1, wherein the first content tag comprises a comment about the first content.

4. The method of claim 1, wherein the first action metadata message includes an address identifier identifying at least a first address of the first device at which a copy of the first content can be retrieved or includes a unique identifier for the first device.

5. The method of claim 1, wherein the act of transmitting the first action metadata message comprises transmitting the first action metadata message to a content share server.

6. The method of claim 5, wherein the content share server is configured to manage communications of action metadata messages between the plurality of devices.

7. The method of claim 1, wherein the first action metadata message comprises the notification.

8. The method of claim 1, further comprising:
   receiving, at the first device one or more messages from the at least one second device and/or a super data-storage node requesting copies of the first content; and
   automatically transmitting at least a portion of the first content to the at least one second device and/or super data-storage node.

9. The method of claim 1, further comprising:
   generating, at the first device, a third action metadata message that identifies the first content to be shared with the at least one second device responsive to a modification being made of the first content at the first device; and
   transmitting, by the first device, the third action metadata message directed to the at least one second device, wherein the generating and transmitting are executed automatically responsive to the modification.

10. The method of claim 1, further comprising:
    issuing, at the first device, a search query that contains at least the first content tag; and
    receiving, at the first device, a search result identifying a plurality of content associated with the first content tag.

11. The method of claim 1, further comprising maintaining, by the first device, a database in which the first content tag is associated with at least the first content.

12. The method of claim 11, further comprising:
    receiving, at the first device, information from a content-share server relating to the first content tag or the first content; and
    updating, by the first device, the database to represent the information received from the content-share server, wherein the content share server is configured to manage communications of action metadata messages between the plurality of devices.

13. The method of claim 12, wherein the information from the content share server identifies at least a third content associated with the first content tag and identifies at least one super data-storage node and/or at least one second device that may have the third content.

14. The method of claim 1, wherein the second content is a modified version of the first content.

15. Non-transitory computer-readable medium encoding machine-readable instructions that, when executed by at least one microprocessor of a first device that is adapted to communicate with a plurality of devices in a data communications network, control the first device to:
  receive an indication of a first content tag being associated with a first content by a user of the first device, wherein the first content is stored at the first device and has been designated to be shared with at least one second device of a plurality of devices configured to communicate over the data communications network; and
  generate, without interaction from the user, a first action metadata message that identifies the first content to be shared with the at least one second device;
  transmit, without interaction from the user, the first action metadata message directed to the at least one second device, wherein the generating and transmitting are executed automatically responsive to the association of the first content tag with the first content;
  transmit automatically, responsive to receiving the indication, a notification directed to a super data-storage node in the data communications network, the notification informing the super data-storage node that the content is available at the first device for transmission to the super data-storage node;
  receive a second action metadata message from one device of the at least one second device of the plurality of devices, wherein the second action metadata message identifies a second content that has been associated with the first content tag by the one device;
  process, automatically and without interaction from the user, the second action metadata message to identify at least one address from which the second content may be retrieved; and
  retrieve, automatically and without interaction from the user, at least portions of the second content from the at least one address.

16. The computer-readable medium of claim 15, wherein the first action metadata message includes an address identifier identifying at least a first address of the first device at which a copy of the first content can be retrieved or includes a unique identifier for the first device.

17. The computer-readable medium of claim 15, wherein the act of transmitting the first action metadata message comprises transmitting the first action metadata message to a content share server that is configured to manage communications of action metadata messages between the plurality of devices.

18. The computer-readable medium of claim 15, wherein the first action metadata message comprises the notification.

19. The computer-readable medium of claim 15, further comprising machine-readable instructions that control the first device to:
  receive one or more messages from the at least one second device and/or a super data-storage node requesting copies of the first content; and
  automatically transmit at least a portion of the first content to the at least one second device and/or super data-storage node.

20. The computer-readable medium of claim 15, further comprising machine-readable instructions that control the first device to maintain a database in which the first content tag is associated with at least the first content.

21. The computer-readable medium of claim 20, further comprising machine-readable instructions that control the first device to:
  issue a search query, responsive to user input, that contains at least the first content tag;
  receive a search result identifying a plurality of content associated with the first content tag; and
  display the search result for the user.

22. The computer-readable medium of claim 20, further comprising machine-readable instructions that control the first device to:
  receive information from a content-share server relating to the first content tag or the first content; and
  update the database to represent the information received from the content-share server, wherein the content share server is configured to manage communications of action metadata messages between the plurality of devices.

23. The computer-readable medium of claim 15, further comprising machine-readable instructions that control the first device to:
  generate a third action metadata message that identifies the first content to be shared with the at least one second device responsive to a second content tag being associated with the first content or a modification being made to the first content occurring at the first device; and
  transmit the third action metadata message directed to the at least one second device, wherein the generating and transmitting are executed automatically responsive to the association of the second content tag or the modification.

24. The computer-readable medium of claim 15, wherein the second content is a modified version of the first content.

25. A content-share server adapted for sharing content between a plurality of devices in a data communications network, the server comprising:
  at least one data communications port; and
  at least one microprocessor, wherein the at least one microprocessor is configured to:
    receive a first action metadata message from a first device of the plurality of devices;
    process the first action metadata message to determine a first identifier of the first device, at least a second identifier of a second device of the plurality of devices with which the first device wishes to share first content, and a first content identifier that identifies the first content that the first device wishes to share with at least the second device and is stored at the first device;
    generate at least a second action metadata message directed to at least the second device, the second action metadata message including the first identifier and the first content identifier;
    add at least a third identifier to the second action metadata message, wherein the third identifier identifies a data storage node from which a copy of at least portions of the first content is available;
    transmit a notification to the data storage node that the first content is available at the first device;
    receive a third action metadata message from one device of the at least the second device, wherein the third action metadata message identifies a second content to be shared with the first device;

process the third action metadata message to identify at least one address from which the second content may be retrieved; and generate at least a fourth action metadata message directed to at least the first device, wherein the fourth action metadata message identifies a data storage node from which a copy of at least portions of the second content is available.

26. The content-share server of claim 25, wherein the content-share server is further configured to maintain a system-wide database that identifies content or content portions available at the plurality of devices.

27. The content-share server of claim 25, wherein the content-share server is further configured to provide registration and log-in services for the plurality of devices.

28. The content-share server of claim 26, wherein the first action metadata message includes a first content tag associated with the first content and the content-share server is further configured to:

add a unique identifier for the first content to the system-wide database;

add, in association with the unique identifier, the first content tag to the system-wide database; and add, in association with the unique identifier, at least the first identifier of the first device and at least a second identifier of the second device to the system-wide database.

29. The content-share server of claim 26, wherein the content-share server is further configured to provide a sub-copy of the system-wide database to the first device, wherein the sub-copy comprises information related to content received by the first device from other devices of the plurality of devices and content shared by the first device with the other devices of the plurality of devices.

30. The content-share server of claim 25, wherein the content-share server is further configured to:

determine whether at least the second device of the plurality of devices is currently on line; and transmit the second action metadata message to the second device if the second device is currently on line; or provide the second action metadata message to the second device at a later time when the second device comes on line.

* * * * *